United States Patent
Gallagher et al.

(10) Patent No.: US 8,634,661 B2
(45) Date of Patent: *Jan. 21, 2014

(54) EVENT CLASSIFICATION METHOD USING LIGHT SOURCE DETECTION

(75) Inventors: Andrew Charles Gallagher, Fairport, NY (US); Peter O. Stubler, Rochester, NY (US); Andrew C. Blose, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 58 days.

This patent is subject to a terminal disclaimer.

(21) Appl. No.: 13/226,885

(22) Filed: Sep. 7, 2011

(65) Prior Publication Data

US 2013/0058583 A1   Mar. 7, 2013

(51) Int. Cl.
*G06K 9/00* (2006.01)
*G06K 9/62* (2006.01)

(52) U.S. Cl.
USPC .......................................... 382/224; 382/100

(58) Field of Classification Search
USPC ................................................. 382/100, 224
See application file for complete search history.

(56) References Cited

U.S. PATENT DOCUMENTS

| | | | |
|---|---|---|---|
| 6,606,411 B1 * | 8/2003 | Loui et al. ..................... | 382/224 |
| 6,652,897 B1 | 11/2003 | Stewart | |
| 7,035,467 B2 * | 4/2006 | Nicponski ..................... | 382/224 |
| 7,583,858 B2 | 9/2009 | Gallagher | |
| 8,055,080 B2 * | 11/2011 | Isomura et al. ............... | 382/224 |
| 8,180,112 B2 * | 5/2012 | Kurtz et al. ................... | 382/108 |
| 8,260,827 B2 * | 9/2012 | Matsushita et al. ........... | 707/805 |
| 2005/0111737 A1 * | 5/2005 | Das et al. ...................... | 382/190 |
| 2007/0008321 A1 * | 1/2007 | Gallagher et al. ............ | 345/473 |
| 2009/0297032 A1 * | 12/2009 | Loui et al. ..................... | 382/195 |
| 2010/0124378 A1 * | 5/2010 | Das et al. ...................... | 382/225 |
| 2010/0245625 A1 | 9/2010 | Gallagher et al. | |
| 2010/0322524 A1 | 12/2010 | Das et al. | |
| 2011/0041086 A1 * | 2/2011 | Kim et al. ..................... | 715/764 |

FOREIGN PATENT DOCUMENTS

WO   WO-2006/122164   11/2006

OTHER PUBLICATIONS

Lowe, "Distinctive image features from scale-invariant keypoints," International Journal of Computer Vision, vol. 60, No. 2, pp. 91-110 (2004).

Jiang et al., "Semantic event detection for consumer photo and video collections," IEEE International Conference on Multimedia and Expo, pp. 313-316 (2008).

Abinav Gupta and Amitabha Mukerjee, "Computational Models for Object Detection and Recognition," downloaded from http://citeseerx.ist.psu.edu/viewdoc/download?doi=10.1.1.107.803&rep=rep1&type=pdf on Aug. 13, 2011.

Gallagher et al., "Clothing Cosegmentation for Recognizing People," IEEE Conference on Computer Vision and Pattern Recognition, pp. 1-8 (2008).

(Continued)

Primary Examiner — Utpal Shah

(57) ABSTRACT

A method for determining an event classification for digital images, comprising: receiving one or more digital images; detecting one or more man-made light emitting sources within the one or more digital images; using a data processor to automatically determine an event classification responsive to analyzing a spatial arrangement of the detected man-made light emitting sources in the one or more digital images; and storing metadata in a processor-accessible memory associating the determined event classification with each of the one or more digital images.

23 Claims, 13 Drawing Sheets

(56) References Cited

OTHER PUBLICATIONS

Felzenszwalb P F et al., "Object Detection with Discriminatively Trained Part-Based Models," IEEE Transations on Pattern Analysis and Machine Intelligence, vol. 32, No. 9, Sep. 1, 2010, pp. 1627-1645.

Fergus R et al., "Object class recognition by unsupervised scale-invariant learning", Proceedings/2003 IEEE Computer Society Conference on Computer Vision and Pattern Recognition, Jun. 18, 2003, vol. 2, pp. 264-271.

International Search Report and Written Opinion for PCT/US2012/053722, mailed Feb. 1, 2013.

Shen-Fu Tsai et al., "Album-based object-centric event recognition", IEEE International Conference on Multimedia and Expo, Jul. 11, 2011, pp. 1-6.

\* cited by examiner

US 8,634,661 B2

EVENT CLASSIFICATION METHOD USING LIGHT SOURCE DETECTION

CROSS-REFERENCE TO RELATED APPLICATIONS

Reference is made to commonly assigned, co-pending U.S. patent application Ser. No. 13/226,796, entitled: "Event classification method for related digital images", by Stubler et al.; and to commonly assigned, co-pending U.S. patent application Ser. No. 13/226,842, entitled: "Event classification method using lit candle detection", by Stubler et al., both of which is incorporated herein by reference.

FIELD OF THE INVENTION

This invention pertains to the field of image processing and data analysis, and more particularly to the automatic determination of event classifications based on the detection of man-made light emitting sources in a digital image.

BACKGROUND OF THE INVENTION

The proliferation of digital cameras and scanners has lead to an explosion of digital images, creating large personal image databases. The organization and retrieval of images and videos is already a problem for the typical consumer. Currently, the length of time spanned by a typical consumer's digital image collection is only a few years. The organization and retrieval problem will continue to grow as the length of time spanned by the average digital image and video collection increases, and automated tools for efficient image indexing and retrieval will be required.

Events in people's lives are one of the most common motivations for capturing digital imagery. Often the central themes of these events are celebrations of various types. Identifying the type of celebration can therefore provide a key piece of semantic information that is highly useful for indexing and retrieving digital imagery.

The development of algorithms for classifying images according to an event type is an area of active research. In U.S. Patent Application 2010/0322524 by Das et al., entitled "Detecting significant events in consumer image collections," a method for determining if an event associated with a collection of digital images is significant is taught. This method evaluates the number of images captured over a time series to determine if an event is significant. It makes no attempt to determine the nature or type of the event.

In U.S. Patent Application 2010/0245625 by Gallagher et al., entitled "Identifying collection images with special events," a method for associating digital images with special events is taught. This method utilizes dated journal entries and image capture times as the sources of information for determining images for the special events. This method is unable to determine the type of event from just the pixels in the image.

U.S. Patent Application 2009/0297032 by Loui et al., entitled "Semantic event detection for digital content records" teaches a method for semantic event classification. This method utilizes visual features in the images to semantically classify the images.

In the article "Computational models for object detection and recognition" by Abinav Gupta and Amitabha Mukerjee, it is suggested that "the detection of a birthday cake and candles in scene would be useful in summarization of birthday videos.

In the article "Semantic Event Detection For Consumer Photo And Video Collections" by Jiang et al. (IEEE International Conference on Multimedia and Expo, pp. 313-316 2008), the problem of event detection is described in images where a collection of images is captured at an event, and the task is to categorize the event as one of 21 event categories, including "wedding", "Christmas", and "birthday." General features are determined and used to represent images within the event, and a classifier is applied to the images from the event to make a determination.

SUMMARY OF THE INVENTION

The present invention represents a method for determining an event classification for digital images, comprising:
  receiving one or more digital images;
  detecting one or more man-made light emitting sources within the one or more digital images;
  using a data processor to automatically determine an event classification responsive to analyzing a spatial arrangement of the detected man-made light emitting sources in the one or more digital images; and
  storing metadata in a processor-accessible memory associating the determined event classification with each of the one or more digital images.

This invention has the advantage that man-made light emitting sources such as holiday lights are often associated with many celebrations and holidays, and consequently the spatial arrangement of the man-made light emitting sources provides important indications of an appropriate event classification.

It has the additional advantage that the determined event classification can be applied to all of the digital images in the set of related digital images even though they may not all contain man-made light emitting sources.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file.

Figure 1:
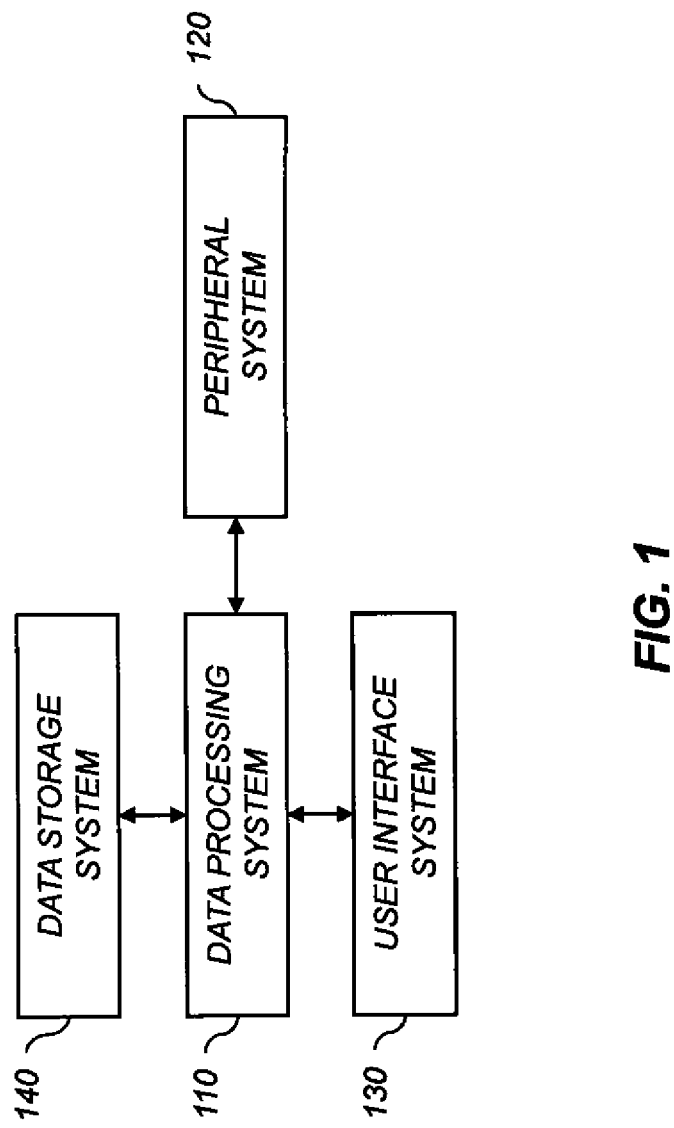
FIG. 1 is a high-level diagram showing the components of a system for determining an event classification for a set of digital images according to an embodiment of the present invention.

FIG. 1 is a high-level diagram showing the components of a system for determining an event classification for a set of related digital images according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

As an important piece of information that can be used to provide an advantaged event classification method, inventors have noted that candles appear in image for many types of events such as birthday celebrations, anniversary celebrations, religious ceremonies and holidays. The presence, type, appearance, and positions of candles in a digital image often provide important clues as to the event type. While the candles themselves come in many shapes and sizes, candle flames are relatively similar to each other and are readily detectable by computer algorithms. The present invention provides an improved event classification method by detecting lit candles and analyzing various attributes related to the candles.

A preferred embodiment of the present invention will now be described with reference to FIG. 2. A digital image collection 200 is provided to identify related digital images step 205 which identifies a set of related digital images 210 in the digital image collection 200. In a preferred embodiment, the identify related digital images step 205 is performed by automatically analyzing the digital images in the digital image collection 200, or metadata associated with the digital images, to identify a subset of the digital images that were captured at a single event.

The identify related digital images step 205 can use any type of analysis known to those skilled in the art to identify the set of related digital images 210. In a preferred embodiment, the set of related digital images 210 are identified by analyzing image capture time metadata that indicates image capture times for the digital images in the digital image collection 200. In one implementation, digital images are identified as being related to each other if a time difference between their image capture times is lower than a predefined threshold (e.g., 30 minutes). In other embodiments, a temporal clustering algorithm is used to identify event clusters. One such temporal clustering algorithm that can be used in accordance with the present invention is disclosed in U.S. Pat. No. 6,606,411 to Loui, et al. entitled "Method for automatically classifying images into events," which is incorporated herein by reference. This method involves applying a 2-means clustering algorithm to identify clusters of digital images having similar image capture times. In some embodiments, the digital images are also analyzed using an image similarity metric to determine whether neighboring clusters should be combined to form larger event clusters.

In other embodiments, the identify related digital images step 205 can analyze other aspects of the digital images besides the image capture times to identify the set of related digital images 210. For example, image filenames can be analyzed to identify digital images having consecutive image sequence numbers. In other embodiments, user-supplied metadata tags can be analyzed to identify related digital images that share the same tag values. In other embodiments, the image content can be analyzed to identify digital images that have a similar appearance. In other embodiments, the set of related digital images 210 can be identified by analyzing a folder structure that was used to organize the digital image collection 200. For example, some applications organize digital images into a hierarchical file structure based on image capture year, month and day. Any digital images falling within the lowest level of the hierarchy can be designated as being related digital images.

In an alternate embodiment, a user interface can be supplied to enable a user to manually designate the set of related digital images 210. For example, thumbnail images can be shown for each of the digital images in the digital image collection 200. The user can then click on individual images that are related to each other to designate the set of related digital images 210. In other embodiments, the user can drag a box around the thumbnail images in the set of related digital images 210. In some embodiments, the user can designate sets of related digital images 210 by manually organizing the digital image collection 200 into folders containing related digital images.

Next, a detect event indicators step 215 is used to analyze the set of related digital images 210 to detect a set of event indicators 220 providing information useful in the determination of the type of event.

Figure 3:
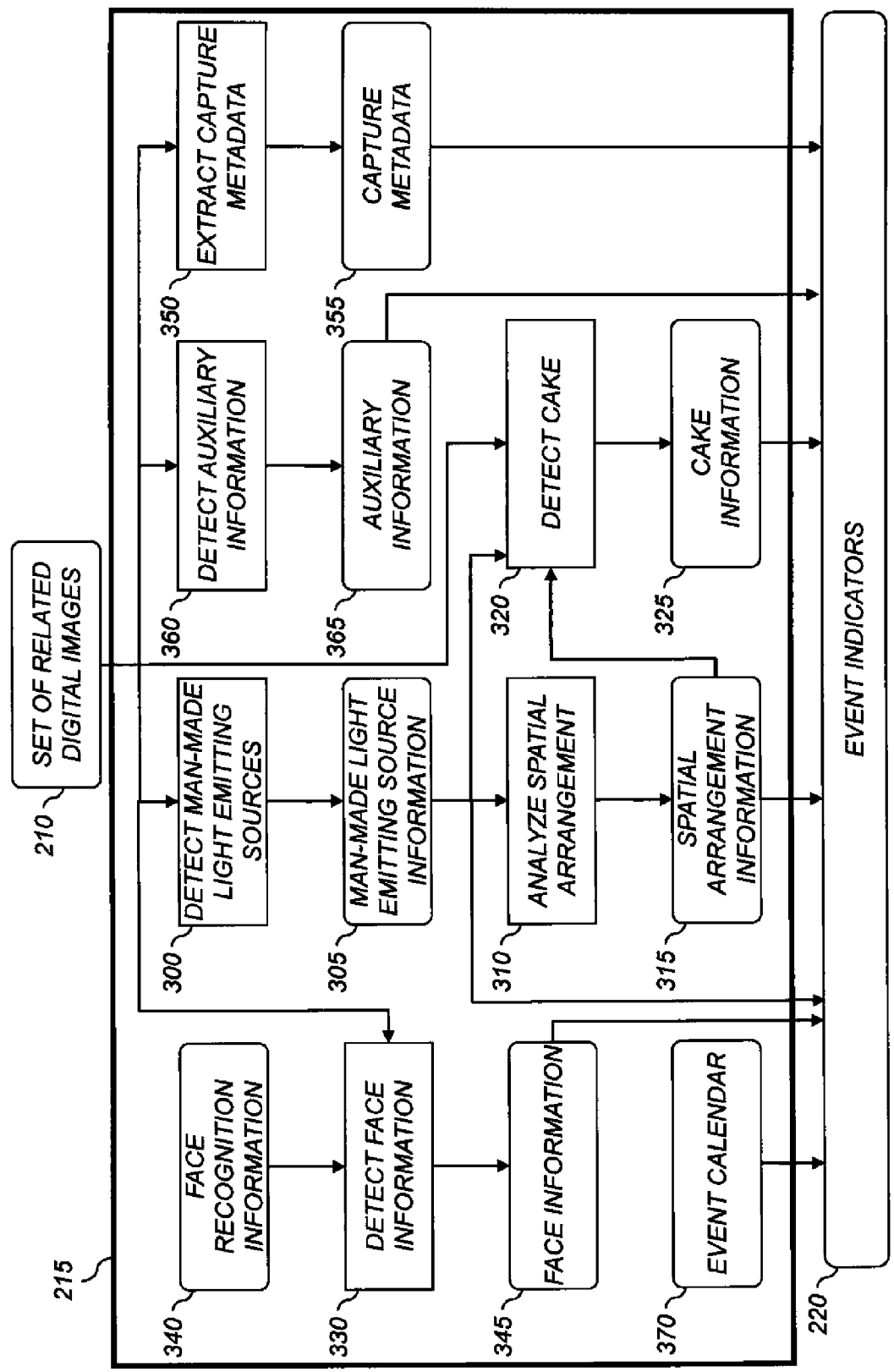
FIG. 3 is a flow chart showing additional details for the detect event indicators step of FIG. 2 according to one embodiment.

FIG. 3 shows additional details regarding the detect event indicators 215 according to a preferred embodiment. A detect man-made light emitting sources step 300 is used to analyze the set of related digital images 210 to determine man-made light emitting source information 305 pertaining to any man-made light emitting sources contained in the digital images. Within the context of the present invention, a man-made light emitting source refers to human-manufactured items intended to release light energy for illuminating a scene or for decorative purposes. For example, man-made light emitting sources would include electric light bulbs of a variety of sizes, styles and colors (including incandescent, fluorescent, gas discharge, neon, LED and OLED lights), candles, fireworks and road flares, but would exclude natural light sources such as the sun, moon and stars.

The detect man-made light emitting sources step 300 includes determining which of the individual digital images in the set of related digital images 210 contain man-made light emitting sources. For each of the individual digital images that are determined to contain man-made light emitting sources, the number, types, spatial locations and descriptive features of the detected man-made light emitting sources are determined. The man-made light emitting sources can include lit candles, as well as various types of electric light sources such as holiday lights and neon lights. For the case where lit candles are detected, the descriptive features preferably include information relating to the candle flames and their corresponding candles. Additional details related to the detect man-made light emitting sources step 300 will be discussed below with regard to FIG. 4.

An analyze spatial arrangement step 310 is used to analyze the spatial arrangement of detected man-made light emitting sources as specified by the man-made light emitting source information 305 to determine spatial arrangement information 315. The spatial arrangement of detected man-made light emitting sources is given by the spatial location in the man-made light emitting source information 305. The spatial arrangement information 315 can include various features determined by analyzing the spatial arrangement of the detected man-made light emitting sources. Examples of some appropriate features that can be determined to characterize the spatial arrangement of the man-made light emitting sources will be discussed below with respect to the discussion of FIG. 9.

In some cases, the spatial arrangement of the detected man-made light sources may provide an indication that some or all of the detected man-made light emitting sources are probably false-positives. For example, this might be the case if the detected man-made light sources are scattered in a random fashion instead of positioned in a deliberate manner as indicated by the spatial arrangement features. In this case, the man-made light emitting source information 305 can be updated accordingly.

The spatial arrangement information 315 pertaining to the man-made light emitting sources within each digital image will typically contain valuable clues as to the type of event associated with the set of related digital images 210. For example, the spatial arrangement of lit candles can be used to detect the presence of a celebration cake (e.g., a birthday cake or an anniversary cake), or to detect patterns of candle arrangements that are associated with particular ceremonies or holidays (e.g., wedding unity candles, Christmas advent candles or Hanukkah menorahs). Alternately, a spatial arrangement of point light sources consistent with holiday lighting decorations (e.g., strings of holiday lights) can be suggestive of Christmas, Halloween or New Year's celebrations. Sometime strings of holiday lights are also used as decorations for events such as weddings, parties and proms. Yet another spatial arrangement of man-made light emitting sources may be consistent with fireworks displays and thus suggest holidays such as Independence Day or New Year's Day.

Man-made light emitting source information 305 and spatial arrangement information 315 are used by a detect cake step 320 to determine whether the digital image contains a cake associated with the light sources (e.g., a birthday cake with lit candles). If a cake is detected, the detect cake step 320 determines cake information 325 relating to the cake. Additional details of the detect cake step 320 and the determined cake information 325 will be discussed below with regard to FIG. 7.

The detect event indicators step provides a set of event indicators 220. In a preferred embodiment, the event indicators include the man-made light emitting source information 305, the spatial arrangement information 315, and the cake information 325. In some embodiments the event indicators 220 can also include other pieces of information. For example, the set of related digital images 210 may be processed by a detect face information step 330 to detect faces, and produce face information 345. The detect face information step 330 may employ a face detector, a facial feature finder, a face classifier or a face recognizer. The face information 345 may include information regarding the digital image, location, pose, expression, estimated age and gender or identity of each face found within the set of related digital images. The detect face recognition step may depend upon predetermined face recognition information 340 pertaining to the faces of persons to be recognized by a face recognizer. In an alternate embodiment, a user interface may be employed to allow a user to designate the position and identity of faces within the set of related digital images 210.

In some embodiments, event indicators 220 may include capture metadata 355 associated with the set of related digital images 210 which can be extracted using an extract capture metadata step 350. In a preferred embodiment, the capture metadata 355 is extracted from metadata stored in standard file formats, such as XMP (Adobe's Extensible Metadata Platform) or EXIF (Exchangeable Image File Format). Examples of capture metadata 355 would include capture date/time, global positioning system (GPS) coordinates, scene brightness level, exposure time, lens aperture or camera mode settings. The capture metadata 355 can provide information that is useful, together with the man-made light emitting source information 305, for determining an event classification for the set of related digital images 210. For example, the capture date/time associated with the digital image being analyzed can be used to provide additional information that is useful to improve the accuracy the results determined by analyze event indicators step 225 (FIG. 2). For example, if the capture date of a particular digital image falls during the month of advent, this increases the likelihood that a candle arrangement is an advent candle arrangement. Similarly, if the capture date of a particular digital image falls during the 8 days of Hanukah, this increases the likelihood that a candle arrangement is a Hanukah candle arrangement.

Some holidays (e.g., Valentine's Day) fall on the same date every year, but other holidays (e.g., Easter, Thanksgiving and Hanukah) may fall on different dates every year. An optional event calendar 370 can be used to provide dates, or ranges of dates, associated with various holidays in a given calendar year. Ceremonies are typically not associated with particular dates. However, in some embodiments, the event calendar 370 can include events that are associated with the owner of the digital image collection 210. For example, the event calendar 370 can be tied to an appointment calendar stored on the user's computer. In this case, the event calendar will often include an entry for important ceremonies such as weddings and baptisms.

In some embodiments, the event indicators 220 can include auxiliary information 365 provided by a detect auxiliary information step 360. Many events include decorations that are useful in classifying the event. For example, many birthday parties have decorations that contain the words "Happy Birthday." In such cases, a text recognition algorithm can provide a direct indication of an appropriate event classification. For another example, detecting the text "Happy Anniversary" or "Congratulations Graduate" identifies the event as an anniversary or graduation respectively. In other cases, the text may be more ambiguous. For example, the text "Congratulations John" would be consistent with the event being a birthday celebration, a graduation celebration, or some other event (e.g., an award ceremony or engagement party).

Often, the recognized text can also include other important information that can be useful in determining an event classification 230 and providing information related to the event. For example, the recognized text may include one or more names, identifying a guest of honor at the celebration. The recognized text may also include a number providing information such as the age of a person celebrating a birthday, the number of years that an anniversary couple has been married or a graduation year.

The type of decorative features can also provide helpful clues about the event classification. For example, the presence of bells on a cake would typically be associated with a wedding or an anniversary. Likewise, a graduation cap would generally indicate a graduation.

In some embodiments, the auxiliary information 365 may include other clues useful in the classification of the event. One such example is the classification of the images as depicting indoor or outdoor scenes. Scenes of holiday lights are often taken outdoors, while birthday celebrations typically take place indoors.

Figure 4:
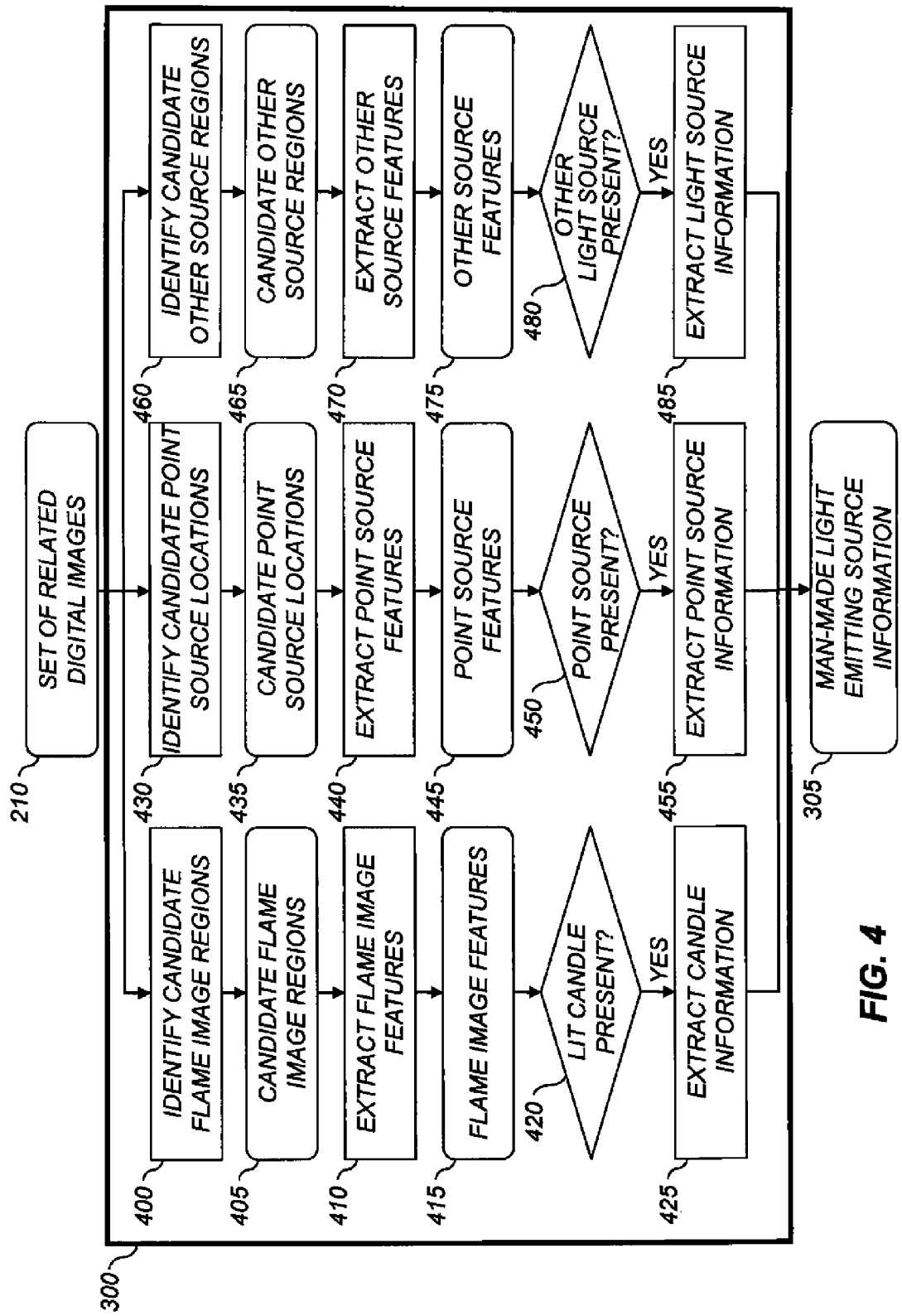
FIG. 4 is a flow chart showing additional details for the detect man-made light emitting source step of FIG. 3 according to one embodiment.

FIG. 4 shows additional details regarding the detect man-made light emitting sources 300 of FIG. 3 according to one embodiment. An identify candidate flame image regions step 400 is used to identify candidate flame image regions 405 within each of the digital images in the set of related digital images 210 that are likely candidates for candle flames. In a preferred embodiment, the candidate image regions 405 are identified by analyzing the pixels in each of the digital images in the set of related digital images 210. By thresholding the image based on pixel color and performing a connected components analysis candidate image regions 405 can be identified.

Figure 5:
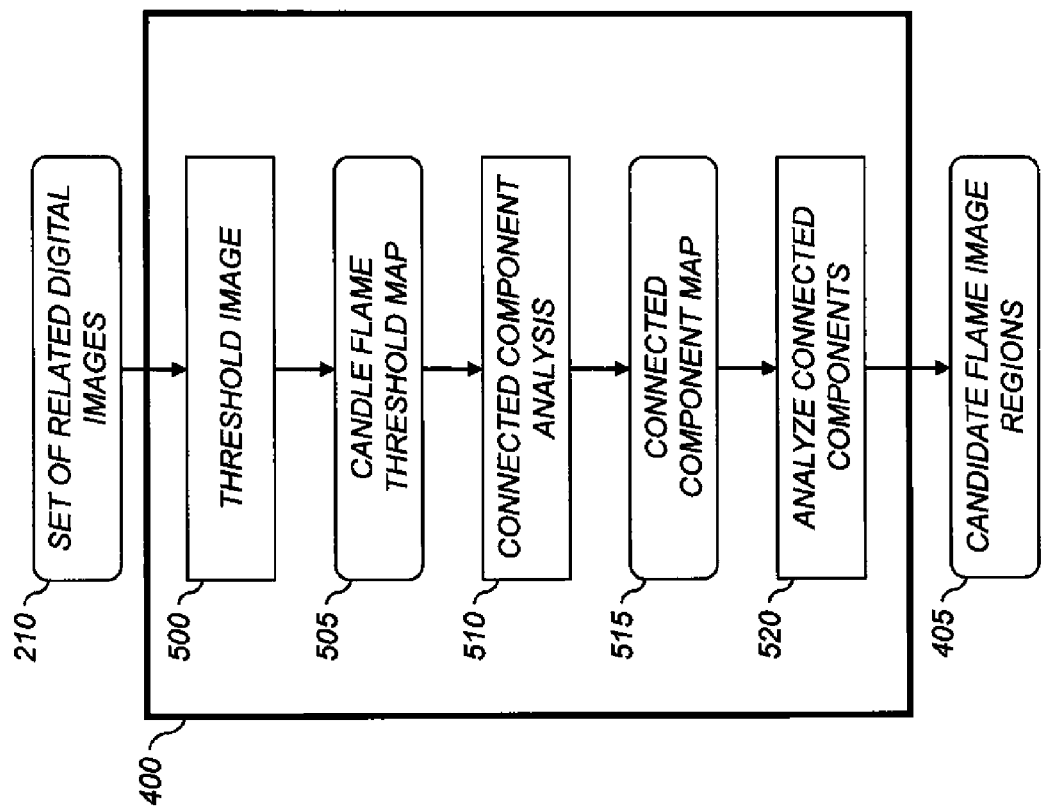
FIG. 5 is a flow chart showing additional details for the identify candidate flame image regions step of FIG. 4 according to one embodiment.

FIG. 5 shows additional details regarding the identify candidate flame image regions step 400 according to one embodiment. Candle flames are usually the brightest portions of a digital image. In addition, candle flames often appear to have a reddish halo region surrounding them. To identify the candidate flame image regions 405 a threshold image step 500 is used to threshold the digital image using two sets of threshold values to produce a candle flame threshold map 505. (Each set of threshold values contains a threshold for each color channel of the digital image.)

Figure 6:
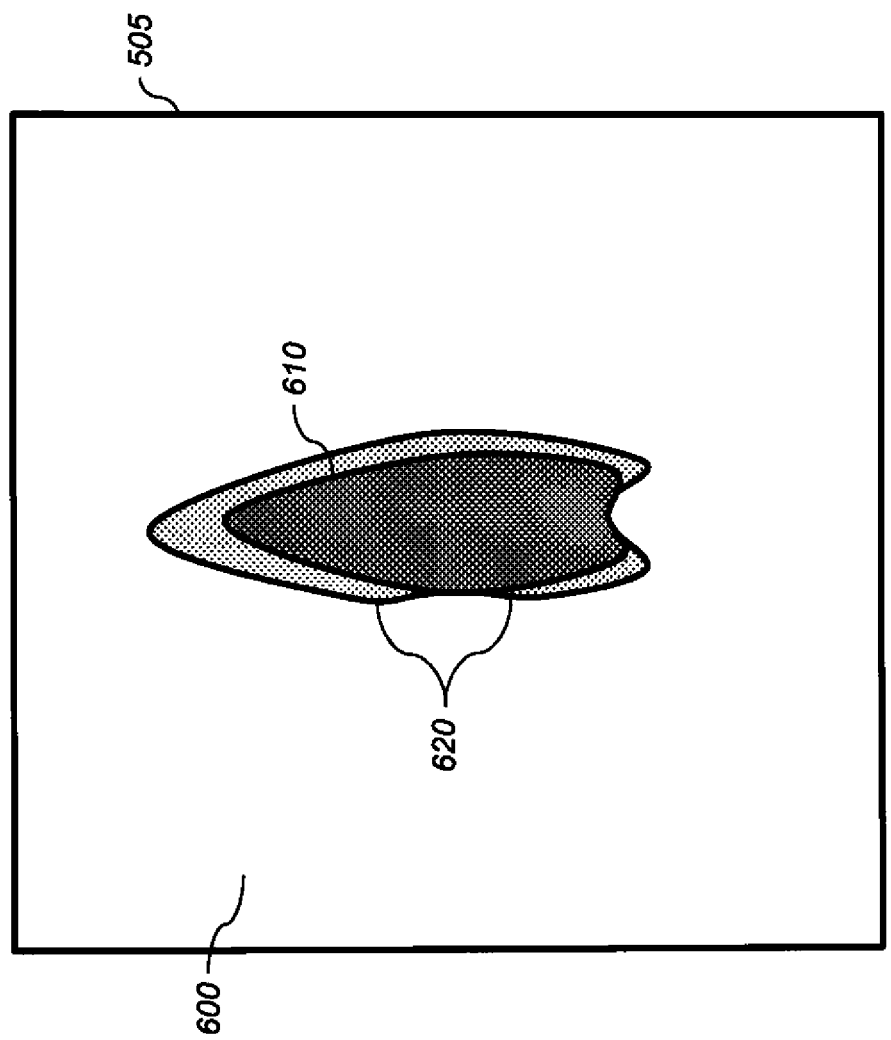
FIG. 6 illustrates an example of a candle flame threshold map.

FIG. 6 shows an example candle flame threshold map 505, which is the result of applying the threshold image step 500 to a portion of an image containing a candle flame. The first set of threshold values is selected such that only extremely bright pixels are above the first threshold values. These pixels are labeled as bright pixels 610. The second set of threshold values are selected so that less bright, reddish pixels are above the second threshold values. The image pixels that are above the second threshold values but not the first threshold values are labeled as halo pixels 620. Pixels that do not exceed either set of thresholds are labeled as background pixels 600.

Referring again to FIG. 5, a connected component analysis step 510 is performed on the candle flame threshold map 505, producing a connected component map 515. The connected component analysis step 510 can use any method known in the art to identify connected sets of pixels. The connected component map 515 is analyzed using an analyze connected components step 520 to identify any candidate image flame regions 405 that contain bright regions along with adjacent halo regions.

Returning to a discussion of FIG. 4, an extract flame image features step 410 is used to extract a set of flame image features 415 from each of the candidate flame image regions 405. In a preferred embodiment, each candidate flame image region 405 is considered in two parts: a bright region including the bright pixels 610 (FIG. 6), and a combined region including both the bright pixels 610 and the adjacent halo pixels 610 (FIG. 6). Flame image features 415 are then determined for each of these region. The flame image features 415 include, but are not limited to, the size, location, ellipticity, and principal axis angle of the bright region; the size, location, ellipticity, principal axis angle of the combined region; the ratio of the size of the bright region to the size of the combined region; the difference in centroids between the bright and combined regions; and the difference in principle axis between the bright and combined regions.

A lit candle present test 420 is used to analyze the flame image features 415 for each candidate flame image region 405 to determine whether the candidate flame image region 405 contains a candle flame. In a preferred embodiment, this determination is made using a trained classifier, which can be constructed by any method known to one skilled in the art of machine learning. The trained classifier evaluates the flame image features 415 for each candidate image region 405 and determines whether a lit candle is present.

For each lit candle that is detected, an extract candle information step 425 is performed to determine candle information that is provided as man-made light emitting source information 305. The candle information preferably includes the flame image features 415, as well as other information about the detected candles. In some embodiments, the orientation of the candle flames within the digital image is used to determine an approximate location of the candle producing each flame. Features describing the candle region are then extracted, and combined with the flame image features 415 and are returned as man-made light emitting source information 305. The features describing the candle region can include various pieces of information such as candle edge locations, a candle orientation and candle color information.

A similar process can be used to detect any point light sources (i.e., small man-made light emitting sources such as electric holiday lights) and determine corresponding point source information. Many digital images feature these types of light emitting sources, and they can often provide important clues about the event classification 230. For example, electric holiday lights are commonly used to decorate homes and buildings (both interior and exterior) around holiday times. Christmas is the most popular holiday for the use of decorative lighting in the United States, and it is common that holiday lights are places on homes (rooflines, lining driveways or walkways), on trees (both inside and outside the home, especially evergreen trees) and on other decorations (e.g. lighted animated reindeer). To a lesser (but possibly growing) extent, decorative lighting is used on other holidays, such as Valentine's Day, Halloween, and New Year's Day. Such holiday lights are often found in the form of a plurality of small electrical light sources (e.g., 50 LEDs) strung along an electrical cord. The strings of holiday lights are often wired in series to span large distances.

Any process for detecting point light sources known in the art can be used in accordance with the present invention. In general, point light sources are characterized by image pixels that are significantly brighter than surrounding pixels. This fact can be used to identify any point light sources in a digital image. In a preferred embodiment, an identify candidate point source locations step 430 is first used to identify candidate point source locations 435.

In a preferred embodiment, the identify candidate point source locations step 430 identifies the candidate point source locations 435 by first identifying pixel locations that are greater than their neighbors by a predefined threshold $T_1$ (e.g., $T_1=50$). That is, by finding the set of pixel locations such that:

$$I(x,y) - T_1 > I(x_n, y_n) \qquad (1)$$

for all neighbors $(x_n, y_n)$ of the pixel location (x,y), where I(x, y) indicates the pixel value. Any operator can be used to define the neighbors of a location (x, y). In the preferred embodiment, the neighbors of (x, y) are all pixel locations such that $|x_n-x|=2$ and $|y_n-y|=2$. In addition, the selected pixel locations must have a pixel value greater than a predefined threshold $T_2$ (e.g., $T_2=150$). Notice that this processing can be applied to each color channel of an image (e.g., red, green, and blue) and the color of the man-made light sources can be easily determined. Further, note that when groups of adjacent pixel locations meet the requirement, they are preferably clustered using a connected component algorithm and are considered to be a single candidate point source location 435 located at a pixel location corresponding to the centroid of the grouped pixel locations.

An extract point source features step 440 is used to extract appropriate point source features 445 for each of the candidate point source locations 435. In a preferred embodiment, the point source features 445 include:
- red, green and blue values of the candidate point source location (3 dimensions);
- median and mean pixel value within a 7×7 pixel neighborhood of the candidate point source location for each color channel (6 dimensions);
- binned local gradients (horizontal and vertical) at the candidate point source location (8 dimensions); and normalized cross correlation with a Gaussian filter (e.g., having a size of 5×5 pixels, and a sigma=1.0) for each channel (3 dimensions).

Each candidate point source location 435 is described by the aforementioned 20 point source features 445.

A point source present test 450 is used to determine whether the candidate point source locations 435 contain point source by analyzing the point source features 445. In a preferred embodiment, the point source present test 450 uses a trained classifier constructed by any method known to one skilled in the art of machine learning. Preferably, the trained classifier that has been trained on examples of candidate point source locations that were known to be point sources and others that were not (i.e., false point sources). In a preferred embodiment, the classifier implements the AdaBoost algorithm, which is well-known in the art, but any classifier (such as a support vector machine, neural network, or Bayesian network) can also be used.

The point source present test 450 indicates whether a candidate point source location 435 is believed to be a man-made light source or not. For those candidate point sources locations that are identified to be point sources, an extract point source information step 455 is used to extract relevant information to be provided as man-made light emitting source information 305. The relevant information preferably includes the pixel location of the point source, and information about the characteristics of the point source (e.g., the color and brightness of the point source).

Similarly, information pertaining to other types of man-made light sources (e.g., neon lights or fireworks) can also be determined. An identify candidate other source regions step 460 is used to identify candidate other source regions 465. This can be done with a process analogous to that described above for the identify candidate flame image regions step 400. An extract other source features step 470 is used to extract appropriate other source features 475 from the candidate other source regions 465. An other source present test 480 is used to determine whether the candidate other source regions 465 contain other light sources by analyzing the other source features 445. In a preferred embodiment, the other source present test 480 uses one or more trained classifiers corresponding to different types of light sources (e.g., neon light sources and fireworks light sources) constructed by any method known to one skilled in the art of machine learning. Finally, an extract light source information step 485 is used to extract information about the detected light sources to be provided as man-made light emitting source information 305.

In some embodiments, any or all of the identify candidate flame image regions step 400, the identify candidate point light regions step 430 and the identify candidate other source regions step 460 can be performed manually. In this case, a user interface can be provided to enable a user to designate locations of any candle flames, point sources or other sources in a digital image. For example, the user can click on each light source, or drag a box around each light source. In some embodiments, the user can specify a light source type (e.g., candle flame or point source). In this case, the lit candle present test 420, the electric light present test 450 and the other light source present test 480 do not need to be performed. In other embodiments, the indicated regions can be automatically analyzed to determine the light source type.

Figure 7:
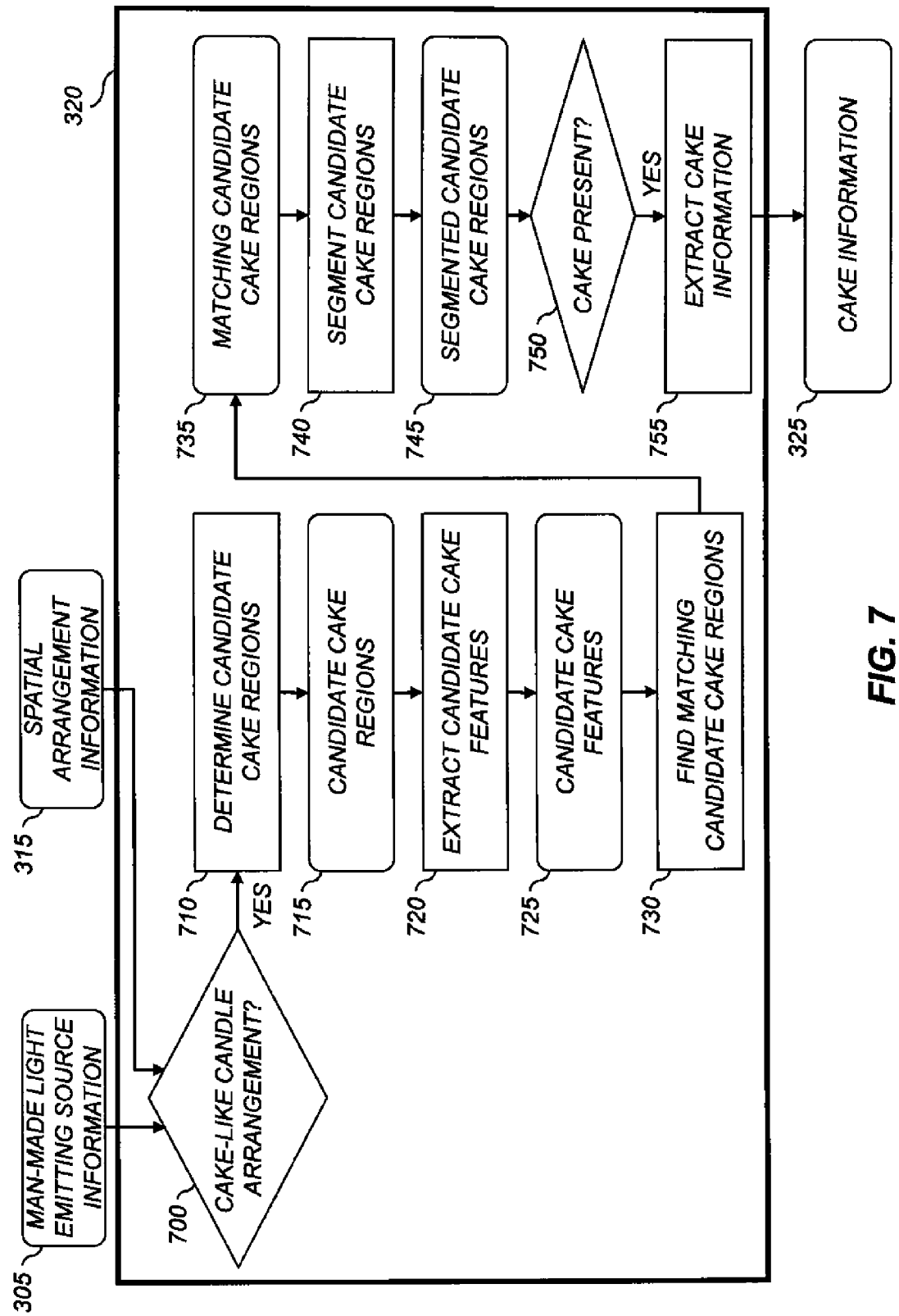
FIG. 7 is a flow chart showing additional details of the detect cake features step of FIG. 3 according to one embodiment.

FIG. 7 shows additional details of the detect cake step 320 of FIG. 3 according to one embodiment. The man-made light emitting source information 305 and spatial arrangement information 315 are provided to a cake-like candle arrangement test 700 which evaluates whether the type and arrangement of man-made light emitting sources are consistent with a celebration cake. In a preferred embodiment, the cake-like candle arrangement test 700 looks for one or more lit candles in a localized image region. If the cake-like candle arrangement test 700 determines that a particular digital image has a cake-like candle arrangement, a determine candidate cake regions step 710 is used to identify a corresponding candidate cake region 715 in the digital image where it would be expected that a cake would be located. In some embodiments, the candidate cake regions 715 are defined to include image pixels within a certain distance of a polygon enclosing the detected lit candles. The content of the digital images in the candidate cake regions 715 are analyzed using an extract candidate cake features step 720 to extract candidate cake features 725. The candidate cake features 725 can be determined using any feature extraction method known in the art. The candidate cake features 725 are preferably a set of features that are useful for finding other matching cake regions in other images, and for evaluating a classifier to determine whether a cake is present.

Once the candidate cake features 725 have been identified, they can be used to find the same cake in other images. A find matching candidate cake regions step 730 is used to identify matching candidate cake regions 735 in other digital images that are likely matches to each of the candidate cake regions 715. The set of matching candidate cake regions 735 may include candidate cake regions 715 from that were identified in other digital images in the set of related digital images 210 (FIG. 2), as well as regions of other digital images that may not have contained cake-like candle arrangements (e.g., an image of the cake with unlit candles). For example, the set of related digital images 210 (FIG. 2) may include a time sequence of digital images showing someone blowing out the candles, or may include digital images of the cake captured from multiple perspectives.

Using this approach, a set of related cake images can be identified even when the candles on the cake are not lit for some of the cake images. Often, the identified related cake images may provide additional information that can be useful to provide a more reliable event classification 230 (FIG. 2). For example, a candidate cake region 715 that is identified by analyzing the spatial arrangement of lit candle(s) may have been from a perspective that does not clearly show the wording on the cake. However, a related cake image may show a top view of the cake where the text can be clearly read. If the top view image did not contain lit candles, it would not have been possible to identify it as a candidate cake image using the cake-like candle arrangement test 700.

In some embodiments, the matching candidate cake regions 735 uses a Scale-Invariant-Feature-Transform (SIFT) object recognition technique to identify the matching candidate cake regions 735. With this approach, the candidate cake features 725 are SIFT features that are determined using a SIFT algorithm. SIFT features have the characteristic that they are scale and rotation invariant. Using SIFT features in object recognition applications is well-known in the image processing art. A SIFT object recognition technique that can be used in accordance with the present invention is described by Lowe in the article "Distinctive image features from scale-invariant keypoints" (International Journal of Computer Vision, vol. 60, no. 2, pp. 91-110, 2004), which is incorporated herein by reference. The SIFT technique described by Lowe identifies salient points as locations of an image that can be accurately identified regardless of scale of the image and regardless of many different transforms of the image (e.g., different scan orientations and resolutions). The SIFT technique uses a cascade filtering approach to identify candidate salient points. It then performs a detailed fit to the nearby data for location, scale, and ratio of principal curvatures for each candidate salient point. Candidate salient points that have low contrast and are poorly localized along an edge are typically rejected. The SIFT technique then generates a local image descriptor (i.e., "feature") for each salient point. The features are orientation invariant and are determined by first computing the gradient magnitude and orientation of each image sample in a region around the salient point. These values are then accumulated into orientation histograms summarizing the content over a 4×4 region. In some embodiments, the orientation histograms have eight bins representing different orientations resulting in a feature that is represented by a 128 (4×4×8) feature vector.

Comparison of SIFT features determined from the candidate cake regions 715 of images in the set of related digital images 210 (FIG. 2) can be made using a nearest neighbor search algorithm. A determination of whether the two candidate cake regions match can be made based on the quantity of features matched. One skilled in the art will appreciate that other techniques may be used to identify the salient points of an image and the features of the salient points, and for evaluating feature matching.

Once a set of matching candidate cake regions 735 has been determined, a segment candidate cake regions step 740 can be used to determine segmented candidate cake regions 745 providing a better estimate of the candidate cake regions. In a preferred embodiment, the segmented candidate cake regions are obtained by segmenting the digital images using information from all of the matching candidate cake regions 735. A method that can be used to perform this segmentation is described by Gallagher et al. in the article "Clothing Cosegmentation for Recognizing People" (IEEE Conference on Computer Vision and Pattern Recognition, pp. 1-8 2008), which is hereby incorporated by reference. Gallagher et al. teach a method to segment the clothing region in each image using graph cuts based on a clothing model learned from one or multiple images believed to be the same person wearing the same clothing. The clothing regions under consideration were associated with a face believed to be the same person. In the present invention, rather than segmenting clothing regions associated with a face, the cake surfaces associated with lit candles and SIFT features are segmented. The results of the segment candidate cake regions step 740 is a set of segmented candidate regions 745.

A cake present test 750 is used to determine whether the segmented candidate cake regions 745 is likely to be a celebration cake. In a preferred embodiment, a set of cake features are extracted from the segmented candidate cake regions 745 and evaluated using a trained classifier. The trained classifier can be constructed using any method known to one skilled in the art of machine learning. The cake features can include SIFT features, as well as other features relating to the cake and candles. For example, many celebration cakes use candles commonly found along with baking supplies at grocery stores. Thus, they have a very common appearance in terms of size, color, and texture. In some embodiments, the method used by the cake present test 750 can include comparing the characteristics of the identified candles to characteristics of the commonly available celebration cake candles.

Figure 2:
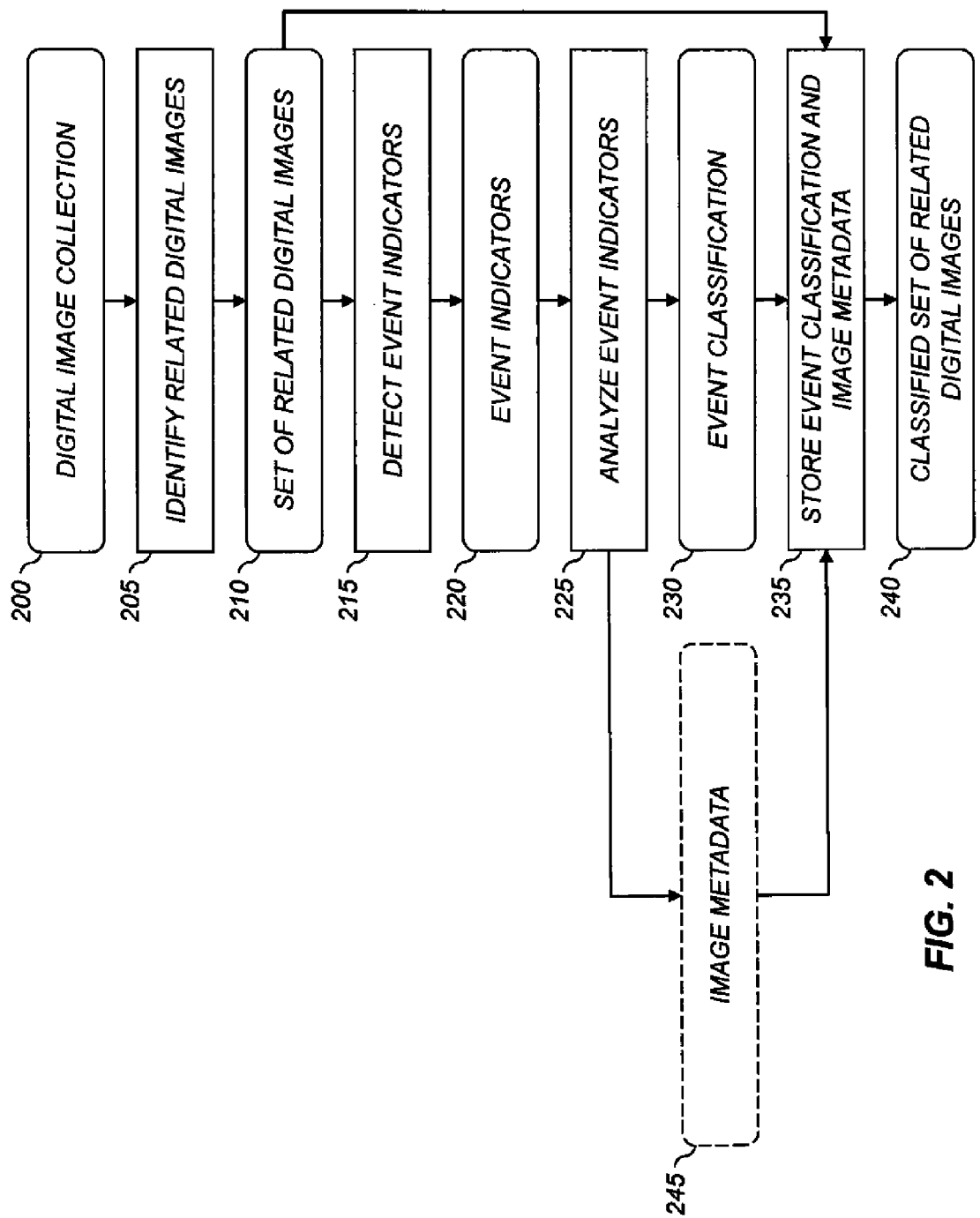
FIG. 2 is a flow chart illustrating a method for determining an event classification in accordance with the present invention.

If the cake present test 750 determines that a cake is present, an extract cake information step 755 is used to extract cake information 325 pertaining to the cake that can be useful in the determination of the event classification 230 (FIG. 2). Types of cake information can include the size, shape and color of the cake; text extracted from writing on the cake; information relating to decorative features on the cake; the type, color and distribution of the candles; and the size and distribution of candle flames.

The writing on the cake often provides many important clues for identifying the event or guests of honor. In some embodiments, the extract cake information step 755 can employ text recognition to extract text from the surface of the cake. This can be done by first identifying a cake surface region within one or more of the cake images. A text region can then be identified within the cake surface region, and an alphanumeric text recognition algorithm can be used to identify the text features written on the surface of the cake. Text recognition algorithms are well-known in the art, and any appropriate method can be used in accordance with the present invention. In many cases, it can be useful to apply a rectification transformation to the cake surface region to correct any projective distortion in the captured image before performing the text recognition algorithm. This can help to improve the reliability of the text recognition process. Rectification transformations are well-known in the image processing art. In some embodiments, coordinates for the four corners of a cake surface region are identified, and a set of parameters for the rectification transformation are determined to transform the cake surface region into a rectangle.

U.S. Pat. No. 7,583,858 to Gallagher, entitled "Image processing based on direction of gravity," describes one method for providing rectification of a perspective-warped scene rectangle (in this case, the surface of the cake). This method works by finding vanishing points associated with both orthogonal directions of the scene rectangle. The vanishing points are then used to determine parameters for the rectification transform.

In some embodiments, parameters for the rectification transform can be determined based on the assumption that the flame sizes are physically similar in size, and that the candle flames are approximately all an equal distance from the (planar) cake surface. The parameters can then be determined (e.g., using a least-square regression technique) such that when the rectification transform is applied to the image of the cake surface the candle flames in the transformed image will have a similar size. This approach has the advantage that it can be used for non-quadrilateral cakes.

With the advent of edible inkjet inks and receiver media as described for example in U.S. Pat. No. 6,652,897, many cakes feature images of the guests of honor. For example, an anniversary cake may feature a reproduction of a wedding picture on its surface. Similarly, a graduation celebration cake may feature the graduate's picture. In such cases, the extract cake information step 755 can employ face recognition technology to match a face appearing on the cake with other faces found within the set of related digital images 210 (FIG. 2) or with faces appearing in other images within the digital image collection 200 (FIG. 2). Thus, in some embodiments, face information may be extracted from the surface of the cake in the same manner employed in the detect face information step 330 described earlier with reference to FIG. 3. As with the detection of text discussed earlier, the extraction of face information is also benefited by first application a rectification transform to the image of the surface of the cake.

Figure 8A:
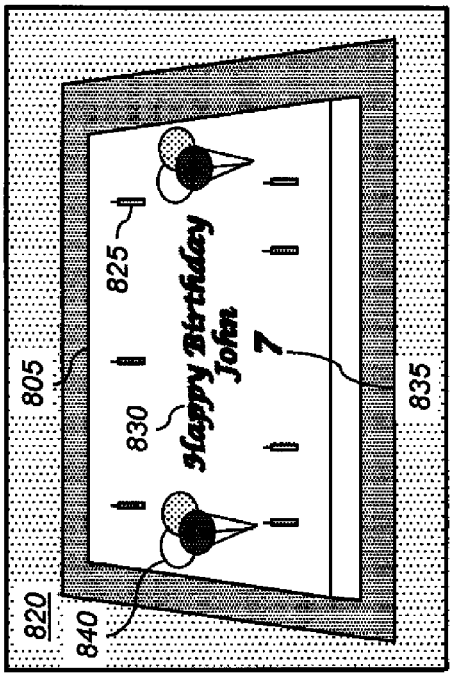
FIG. 8A illustrates a digital image including a birthday cake with lit candles.

An example of a digital image 800 including a birthday cake 805 is shown in FIG. 8A. The birthday cake contains a set of seven lit birthday candles 810, together with a guest of honor 815. In this case, the man-made light emitting source information 305 (FIG. 3) will include information about the lit candles 810 and the spatial arrangement information 325 (FIG. 3) will include information describing the spatial arrangement of the lit candles 810. This information can be used by the cake-like candle arrangement step 700 (FIG. 7) to determine a corresponding candidate cake region 715 (FIG. 7) in the digital image 800, from which candidate cake features 725 (FIG. 7) are extracted.

Figure 8B:
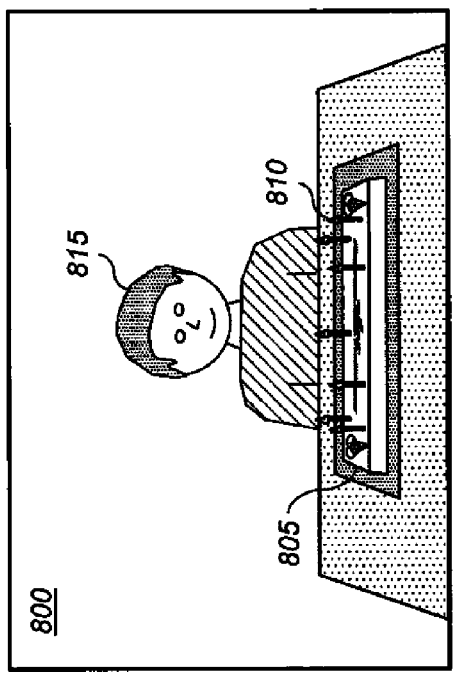
FIG. 8B illustrates a digital image including another view of the birthday cake from FIG. 8A where the candles are unlit.

FIG. 8B shows another related digital image 820 that also includes the same birthday cake 805, this time with unlit birthday candles 825. The find matching candidate cake regions step 730 (FIG. 7) can be used to identify the digital image 820 as containing a matching candidate cake region 735 (FIG. 7). From the perspective shown in the digital image 820, the details of the birthday cake 805 can be more clearly seen to contain decorative features 840, as well as a text region 830 including the text message "Happy Birthday John" together with an age 835 (i.e., "7").

Figure 8C:
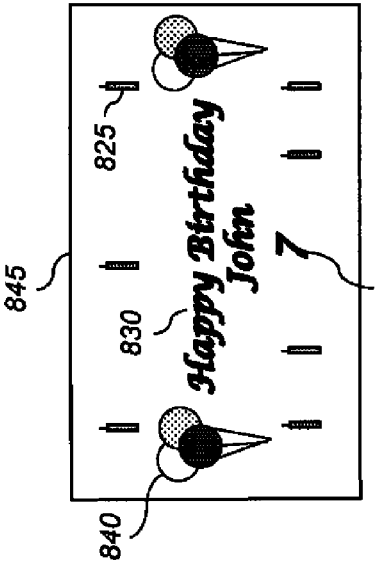
FIG. 8C illustrates a corrected cake surface region determined by applying a rectification transformation to the cake surface region of FIG. 8B.

It can be seen that the digital image 820 contains projective distortion which makes the rectangular cake appear to be trapezoidal. A rectification transformation can be used to correct for this projective distortion, producing the rectified cake surface region 845 shown in FIG. 8C. The rectified cake surface region 845 can be more reliably analyzed using the extract cake information step 755 (FIG. 7) to determine cake information 325 (FIG. 7) useful in the determination of the event classification 230 (FIG. 2). For example, text recognition, face detection, and face recognition algorithms generally work better on undistorted text and images.

Returning now to a discussion of FIG. 2, the preceding discussions have addressed the wide variety of information that can be extracted from the set of related digital images 210 and presented in the event indicators 220. An analyze event indicators step 225 is used to determine an event classification 230 by analyzing the determined event indicators 220. In some embodiments, the analyze event indicators step 225 can optionally determine various other pieces of image metadata 245 relating to the set of related digital images 210.

Figure 9:
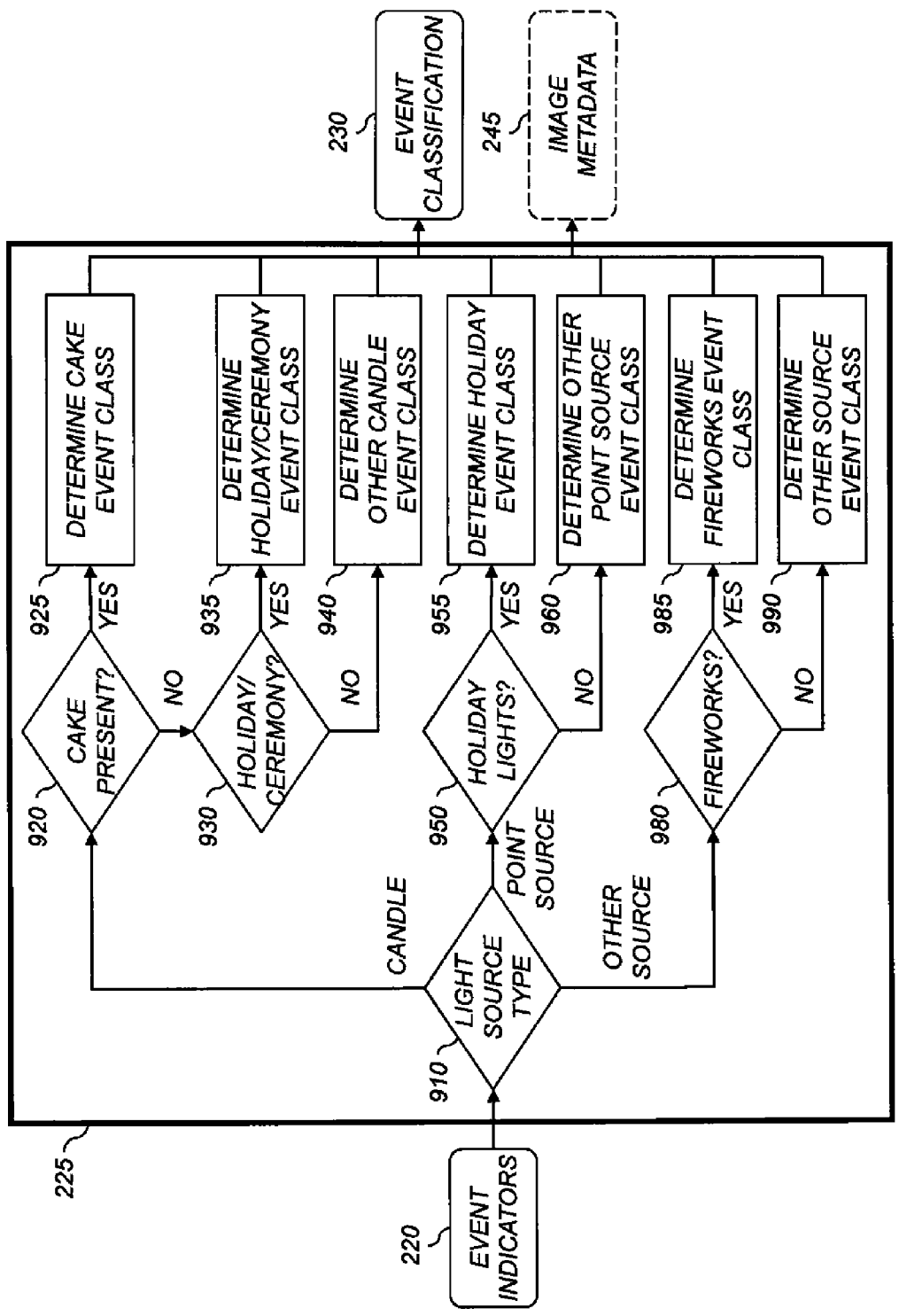
FIG. 9 is a flow chart showing additional details of the analyze event indicators step of FIG. 2 according to one embodiment.

The analyze event indicators step 225 can use any method known in the art to determine the event classification 230 and the image metadata 245 from the event indicators 220. FIG. 9 shows a flowchart illustrating additional details of the analyze event indicators step 225 according to one embodiment. In this example, a decision tree approach is used to narrow in on the relevant event classification 230. In other alternate embodiments, the analyze event indicators step 225 can utilize other approaches. For example, a classifier can be trained to operate directly on the event indicators 220 using any method known in the field of machine learning.

According to the method shown in FIG. 9, a light source type test 910 is used to first determine the type(s) of man-made light emitting sources present in a digital image as indicated by the event indicators 220. The light source type provides valuable information that is useful for determining the most likely event classification 230.

If the light source type test 910 determines that the digital image contains candles, a series of additional tests can be used to further narrow down the event classification options. Many digital images that contain candles are celebration cake images including a set of lit candles. A cake present test 920 can be used to determine whether a cake is present in the digital image. In some embodiments, the cake present test 920 can be identical to the cake present test 750 of FIG. 7. In a preferred embodiment, when the digital image includes a celebration cake, the event indicators 220 include cake information 325 (FIG. 3) determined using a method such as that which was discussed relative to FIG. 7. In this case, the cake present test 920 can simply examine the event indicators 220 to determine whether cake information 325 is present.

The detection of a cake is strongly indicative of certain types of celebrations at which cakes are commonly found. The types of celebrations include but are not limited to birthdays, weddings, anniversaries, graduations and retirements. If the cake present test 920 determines that a celebration cake is present, a determine cake event class step 925 is used to determine a corresponding event classification 230 responsive to the event indicators 220.

The determine cake event class step 925 can use any method known in the art to determine the event classification 230 for digital images containing a celebration cake. In a preferred embodiment, the determine cake event class step 925 uses various pieces of information stored in the event indicators 220 to determine the event classification 230. As was discussed with reference to FIG. 3, the event indicators 220 include information pertaining to the detected light sources (represented by the man-made light emitting source information 305) and the spatial arrangement of the light sources (represented by spatial arrangement information 315). In some embodiments, the event indicators 220 can also include information pertaining to any detected celebration cakes (represented by cake information 325), information pertaining to persons detected to be in the image (represented by face information 345), information pertaining to known events (from event calendar 370) that occurred on or near the image capture date (as determined from the capture metadata 355), or other relevant information (represented by auxiliary information 365).

In many cases, any text recognized by the text recognition algorithm can provide a direct indication of the event classification 230. The text may have been extracted from the surface of the cake and stored in the cake information 325, or may have been detected in the scene (for example on a banner) and represented in the auxiliary information 365. For example, detecting the text "Happy Anniversary," either on the surface of the cake or on decorations within the set of digital images, can be used to directly identify the event classification 230 as an "anniversary event." Similarly, detecting the text "Happy Birthday" identifies the event classification as a "birthday event," or detecting the text "Congratulations Graduate" identifies the event classification as a "graduation event." In other cases, the text may be more ambiguous. For example, the text "Congratulations John" would be consistent with the event classification 230 being a birthday event, a graduation event, or some other event (e.g., an award ceremony event or an engagement party event).

Often, the recognized text can also include other important information that can be useful in determining the event classification 230 and providing information related to the event that can be stored as image metadata 245. For example, the recognized text may include one or more names, identifying a guest of honor at the celebration. The recognized text may also include a number providing information such as the age of a person celebrating a birthday, the number of years that an anniversary couple has been married, or a graduation year.

The type of decorative features on the cake or elsewhere within the set of related digital images 210 can also provide helpful clues about the event classification. (Information about the decorative features may be represented in cake information 325 or auxiliary information 365.) For example, the presence of bells on a cake would typically be associated with a wedding cake or an anniversary cake. Likewise, a graduation cap would generally indicate a graduation cake.

The shape and color of the cake (as represented in the cake information 325) can also provide an indication of the event classification 230. For example, white tiered cakes are typically associated with weddings, whereas round layer cakes with colored frosting are more often associated with birthdays. Likewise, the size, type, color and pattern of the candles (as represented by man-made light emitting source information 305 and spatial arrangement information 315) can provide additional indications of the cake type, and therefore the event classification 230. Between 1 and 20 small colored candles distributed across the cake would typically be associated with a birthday cake, where the number of candles generally indicates the age of the guest of honor. Candles shaped like numbers are often used for birthday cakes for older guests of honor, or sometimes for anniversary cakes. In this case, the age or anniversary year can be determined directly from the numbers and stored in the image metadata 245.

In some embodiments, the determine cake event class step 925 can also include an analysis of features derived from other parts of the digital image besides the cake region. For example, the face information 345 may indicate that the automatic face detection algorithm detected faces in the digital image(s) containing the celebration cake. If one or more faces are detected in the vicinity of the celebration cake, then this can provide useful clues for determining the event classification 230. For example, if one face is detected in a position immediately behind the celebration cake, then this is consistent with the cake being a birthday cake, particularly if the set of related digital images 210 (FIG. 3) includes an image including the cake with lit candles followed by an image including the same cake with candles extinguished. If a pair of faces is detected immediately behind the celebration cake, then this would be consistent with the cake being an anniversary cake. In addition, sequences of images within the set of related digital images can be analyzed to determine whether one or more faces is featured more prominently than others.

In some embodiments, the information from the event calendar 370 can be used to provide additional information that can be useful to the determine event classification 230 and the image metadata 245. The event calendar 370, together with the image capture date/time of the particular digital image being analyzed (represented in the capture metadata 355), can be used determine more information about the event. For example, if the event classification 230 is "birthday" and the event calendar 370 indicates a specific person's birthday on or about the image capture date, the event classification 230 can be for the specific person's birthday (e.g., "John's Birthday") rather than simply providing a generic birthday event classification. Alternatively, a generic "birthday" classification can be used for the event classification 230 and an indication that the guest of honor is John can be stored in the image metadata 245.

For cases where a face detection algorithm was used to detect one or more persons in the digital image, the person identification information (e.g., determined using text recognition or the event calendar) can be used to associate a name with the particular face. This can provide useful information for training a face recognition algorithm to recognize the same person in other digital images. For example, if a face is detected in close proximity to a birthday cake, and the event calendar 370 is used to determine that the image was captured on John's birthday, it can be inferred that the detected face is probably John. This information can be used to train a face recognition algorithm that for recognizing John in other digital images.

In some cases, the determine cake event class step 925 may not detect any clear indication of an appropriate event classification (e.g., if the event features are inconsistent with the expected cake features). In the case, the determined event classification 230 can be set to be "unknown event."

Many types of holidays and ceremonies have candles associated with them. Information about the type and spatial arrangement of the candles can be used to provide important clues as to the type of holiday or ceremony. If the cake present test 920 indicates that no cake is present, a holiday/ceremony test 930 is used to determine whether the candles correspond to a recognizable arrangement of candles associated with a holiday or ceremony. If so, a determine holiday/ceremony class step 935 is used to determine the associated event classification.

Figure 10A:
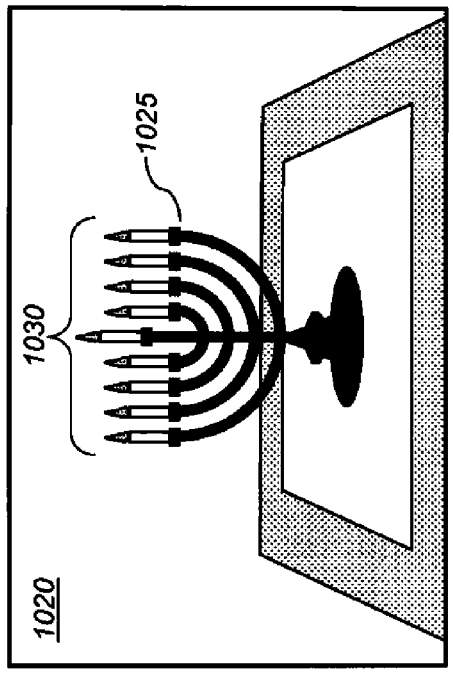
FIG. 10A illustrates a digital image including an advent candle arrangement.

An example of a recognizable arrangement of candles associated with a holiday is an advent candle arrangement, which would be associated with the Christmas holiday. FIG. 10A illustrates an example of a digital image 1000 including a Christmas advent wreath 1005 with an arrangement of lit candles. The candles used for an advent wreath are often much larger than those found on celebration cakes. Advent candle arrangements typically include four advent candles 1010 distributed around the advent wreath 1005. Some advent candle arrangements include a central candle 1015, which is often taller or wider than the outer four advent candles 910. One of the advent candles 1010 is lit during the first week of the advent (Christmas) season. Additional advent candles 1010 are lit during successive weeks, so that digital images of advent wreaths may have one, two, three, four or five lit candles depending on when the digital image is captured. In some embodiments, if the determine holiday/ceremony event class step 935 determines that a particular digital image contains a group of between 1 and 5 lit candles, further analysis is performed to determine whether the candle arrangement correspond to an advent candle arrangement. For example, a classifier can be trained to recognize advent candle arrangements responsive to the man-made light emitting source information 305, the spatial arrangement information 315 as well as other features (e.g., SIFT features) determined from the digital image.

Figure 10B:
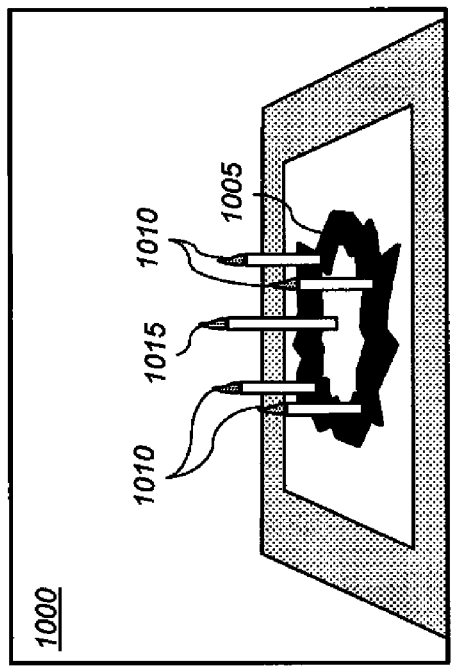
FIG. 10B illustrates a digital image including a Hanukah candle arrangement.

Another example of a recognizable arrangement of candles associated with a holiday is a menorah which is used to hold candles that commemorate the Jewish holiday of Hanukah. Menorahs used to celebrate Hanukah generally contain nine candles arranged in a symmetrical pattern. These candles are also typically very different from celebration cake candles. FIG. 10B shows an example of a digital image 1020 including a menorah 1025, with an arrangement of nine lit menorah candles 1030. Often the central menorah candle 1030 may be positioned at a higher level than the other candles. As with advent candle arrangements, the menorah candles 1030 are progressively lit during the Hanukah holiday. As a result, images containing menorahs may contain various numbers of lit candles. In some embodiments, if the determine holiday/ceremony event class step 935 determines that a particular digital image contains a group of between 1 and 9 lit candles, further analysis can be performed to determine whether the particular digital image includes a menorah candle arrangement. For example, a classifier can be trained to recognize menorah candle arrangements.

Figure 10C:
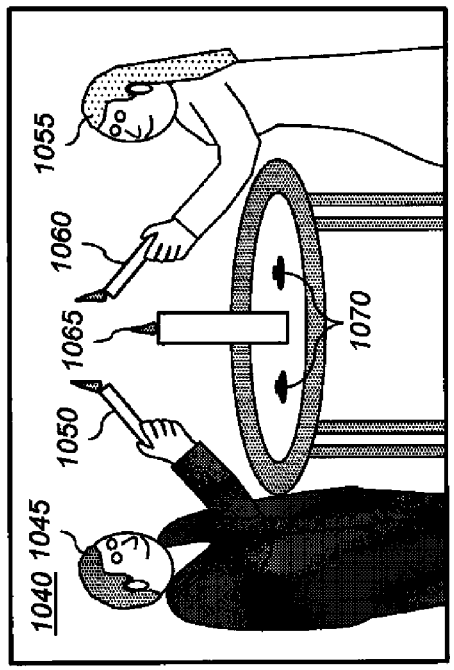
FIG. 10C illustrates a digital image including a wedding unity candle arrangement.

An example of a recognizable arrangement of candles associated with a ceremony is a unity candle arrangement associated with many weddings. Unity candle arrangements typically include a pair of candles symbolizing the groom and the bride, and a larger central candle symbolizing the marriage union. FIG. 10C shows an example of a digital image 1040 including a unity candle arrangement. In this example, a groom 1045 is holding a lit groom candle 1050, and a bride 1055 is holding a lit bride candle 1060. In this example, they have just lit a central unity candle 1065. At different points during the wedding ceremony different arrangements of lit unity candles can be found in digital images captured at the wedding. Typically, at the beginning of the ceremony, the groom candle 1050 and the bride candle 1060 are positioned in candleholders 1070. The parents of the groom 1045 and bride 1055 will then light the respective groom candle 1050 and bride candle 1060. Then at an appropriate time during the ceremony the groom 1045 and bride 1055 will use their respective candles to light the central unity candle as shown in FIG. 10C. They will then blow out the groom candle 1050 and bride candle 1060 and replace them in the candleholders 1070. Therefore, digital images including a unity candle arrangement may have two, three or one lit candles depending upon what point in the ceremony the image is captured. In some embodiments, if the determine holiday/ceremony event class step 935 determines that a particular digital image contains between 1 and 3 lit candles, further analysis can be performed to determine whether the particular digital image includes a unity candle arrangement. For example, a classifier can be trained to recognize unity candle arrangements.

Other examples of holidays and ceremonies that often have candles associated with them would include Valentine's Day, baptisms and confirmations. The determine holiday/ceremony event class step 935 can be generalized to detect candle arrangements associated with these or other holidays and ceremonies.

In some embodiments, the determine holiday/ceremony event class step 935 is integrated with the holiday/ceremony test 930. In this case, the holiday/ceremony test 930 works by analyzing the event indicators 220 using a series of classifiers (i.e., the set of classifiers used by the determine holiday/ceremony event class step 935) to determine whether the candle arrangement correspond to a known holiday or ceremony. If one of the classifiers determines that the candle arrangement corresponds to a particular holiday or ceremony, the event classification 230 is set accordingly. If none of the classifiers produce a positive response, then the holiday/ceremony test 930 returns a value indicating that the candle arrangement does not correspond to a known holiday or ceremony.

If the holiday/ceremony test 930 determines that the candle arrangement does not correspond to a known holiday or ceremony, a determine other candle event class step 940 is called to determine the event classification 230. In some embodiments, the determine other candle event class step 940 simply sets the event classification to "unknown" and optionally stores information about the candle arrangement in the image metadata 245. In other embodiments, the determine other candle event class step 940 uses conventional event classification methods (e.g., methods that are unrelated to the presence of candles) to analyze the image and estimate the event classification 230.

Next, consider the case where the light source type test 910 determines that the event indicators 220 provide an indication that the digital image includes point sources. The arrangement of the point sources contains a great deal of information that can be used for effective event classification. In the example embodiment shown in FIG. 9, a holiday lights test 950 is used to determine whether the arrangement of point sources is consistent with a set of holiday lights. In some embodiments, the holiday lights test 950 analyzes a set of features related to the spatial arrangement of the light sources using one or more trained classifiers. In a preferred embodiment, the set of features includes:

the (x,y) pixel locations of each detected point source, along with the mean and variance of the pixel locations;
the number of detected point sources;

a "compactness" value for the detected point sources (e.g., the ratio of the area of the convex hull of all (or some number less than all) of the detected point sources, to the area of the digital image);

D: the sum of the edges of a Delaunay triangulation computed for the detected point sources (for this feature, each detected point source is considered as a vertex in a graph G, formed using by the well-known Delaunay triangulation);

M: the sum of the edges of a minimal spanning tree computed for the detected point sources (a minimal spanning tree is a graph of K nearest neighbors formed over the vertexes where edges are established between each vertex and its K=1 nearest neighbors); typically, the edges in the minimal spanning tree follow the traces of actual physical electrical wires or cords used to construct the lighting arrangement;

M/D: the ratio of the two preceding quantities (a man-made arrangement of point sources typically has a lower M/D ratio than when the detected point sources are actually false positives, such as small segments of skylight between the branches/leaves of a tree in a forest, which are more likely to be randomly distributed across the image); and an orientation histogram for the light sources (in one embodiment, a principle axis or direction is found for each light source, and is quantized into 16 bins representing angles between $-\pi$ and $\pi$); the orientation histogram represents the distribution of the orientation directions of the lights, and is useful for capturing information about the point sources (e.g., Christmas lights on a Christmas tree typically have a random arrangement of bulb orientations).

It should be noted that the orientation histogram is also a useful feature for analyzing the spatial arrangement of lit candles. When the man-made light emitting sources are candle flames, the orientation histogram can be used to detect images where the lit candles are being blown out (as is the customarily done by the birthday guest of honor). When the candles are blown out, their flames flicker (i.e. take a nearly random orientation) or follow the direction of the "breeze" (i.e., following the guest of honor's breath). In contrast, in a still-air environment the candle flames are elongated in the vertical direction. Thus, the orientation histogram is useful for determining a sub-event classification related to "blowing out the candles" at a birthday event. Further, this feature is also useful for selecting an emphasis image from the set of related digital images 210 (FIG. 2), as the moment when candles are blown out is often a desirable representative of the birthday event. The selected emphasis image can, for example, be given a position of prominence in various applications. For example, more hardcopy prints of the emphasis image can be printed, the emphasis image can be printed larger than the other images, more space can be allocated for the emphasis image in a layout of multiple images (e.g., on a softcopy display), or the emphasis image can be displayed for an extended period of time relative to other images.

In some cases, even more sophisticated spatial processing is possible. For example, if holiday lights are on strung on an electrical cord at equal distances, it is possible to reconstruct the 3D positions of each light. This is useful, for example, when the man-made light emitting sources are positioned along the roofline and wall corners of a building or house. Further, if the physical size of each man-made light emitting source is roughly equal, then the size of the point sources in the image (e.g., as measured by the number of pixels) is related to the distance of the light emitting source from the camera. The smaller that the light emitting source appears to be, the more distant that the light emitting source is from the camera.

If the holiday lights test 950 determines that the arrangement of point sources is consistent with a set of holiday lights, a determine holiday event class step 955 is used to determine a corresponding event classification 230 the event indicators 220, and optionally to provide associated image metadata 245. Any method known in the art can be used to determine the holiday event classification. Many aspects of the image represented in the event indicators 220 can provide important clues for identifying the holiday, including the man-made light emitting source information 305, the spatial arrangement information 315, the auxiliary information 365, the capture metadata and the event calendar 370.

In some embodiments, the determine holiday event class step 955 analyzes the colors of the individual detected holiday lights. For example, some strings of holiday lights contain bulbs that alternate in color (e.g., red-white-red-white); this pattern of colors can provide an indication that the detected man-made lights are associated with a Christmas event. Similarly, orange lights are often associated with Halloween. In some embodiments, the determine holiday event class step 955 also compares the capture date for the digital image from the capture metadata 355 to the dates of known holidays, which can either be predetermined or can be determined from the event calendar 370. If a digital image containing orange holiday lights has a capture date in late October, there is a high likelihood that the digital image corresponds to a Halloween event classification. Likewise if a digital image containing an arrangement of holiday lights has a capture date in December, there is a high likelihood that the digital image corresponds to a Christmas event classification.

In some embodiments, the determine holiday event class step 955 utilizes a set of classifiers (e.g., a support vector machine classifier) trained to recognize the different event types responsive to the event indicators 220. For example, FIG. 11A shows a digital image 1100 including a Christmas tree 1102 decorated with holiday light strings 1106 having a plurality of electric holiday lights 1104. The detected man-made light emitting sources are point sources, and occur in a compact spatial arrangement (i.e., they are densely packed around the tree region). Additionally, an analysis of the spatial arrangement can reveal several distinct strings of lights. This information, together with other information such as the image capture date, can be used by a trained classifier to draw the conclusion that the event classification 230 should be "Christmas event." In some embodiments, a finer sub-event classification can also be provided (e.g. "Christmas lights on tree").

Figure 11B:
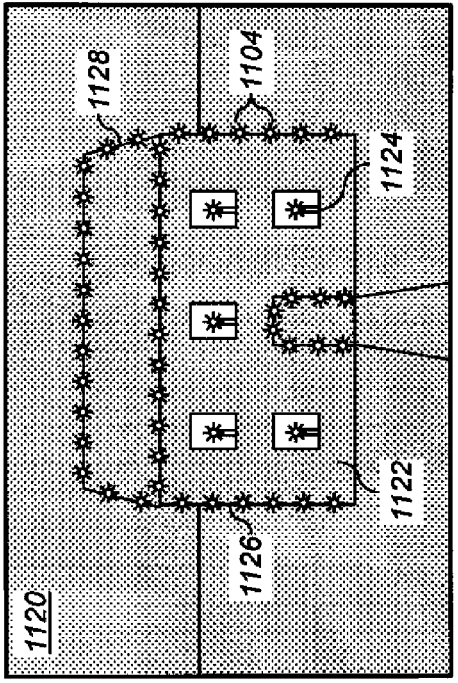
FIG. 11B illustrates a digital image including a house decorated with holiday lights.
Figure 11A:
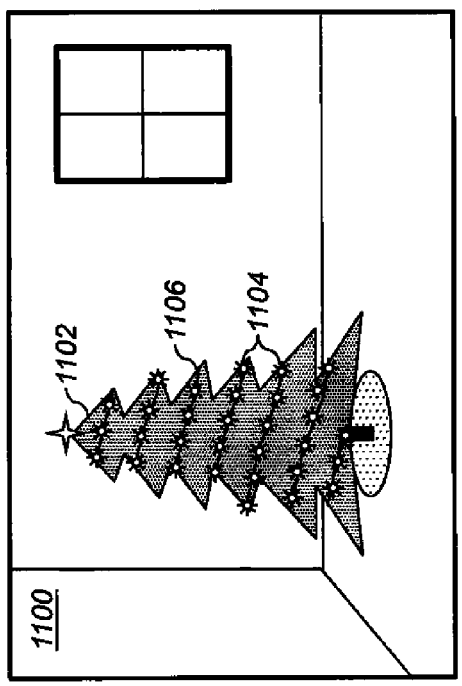
FIG. 11A illustrates a digital image including a Christmas tree.

In FIG. 11B, a digital image 1120 of a house 1122 is shown containing electric candles 1124 in the windows and strings of electric lights 1104 arranged along the house corners 1126 and the roofline 1128. This structure is captured by the spatial analysis of the lights, and can be analyzed using a trained classifier to draw the conclusion that the event classification 230 should be "Christmas event." In some embodiments, a finer sub-event classification can also be provided (e.g. "Christmas lights on house").

Figure 11C:
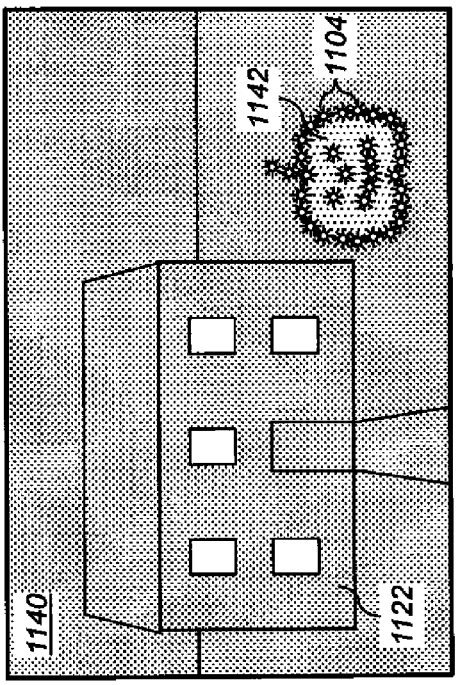
FIG. 11C illustrates a digital image including a Halloween display of holiday lights.

FIG. 11C illustrates a digital image 1140 of a house 1122 including a decorative jack-o-lantern 1142, lit by strings of holiday lights 1104. Features such as the spatial arrangement and color of the holiday lights 1104, and the image capture date are used by a trained classifier to draw the conclusion that the event classification 230 should be "Halloween event." In some embodiments, a finer sub-event classification can also be provided (e.g. "Halloween jack-o-lantern").

Figure 12A:
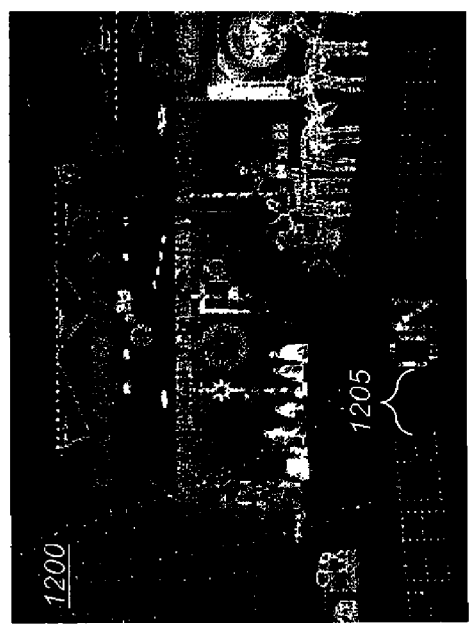
FIG. 12A illustrates a digital image including a complex display of Christmas holiday lights.
Figure 12C:
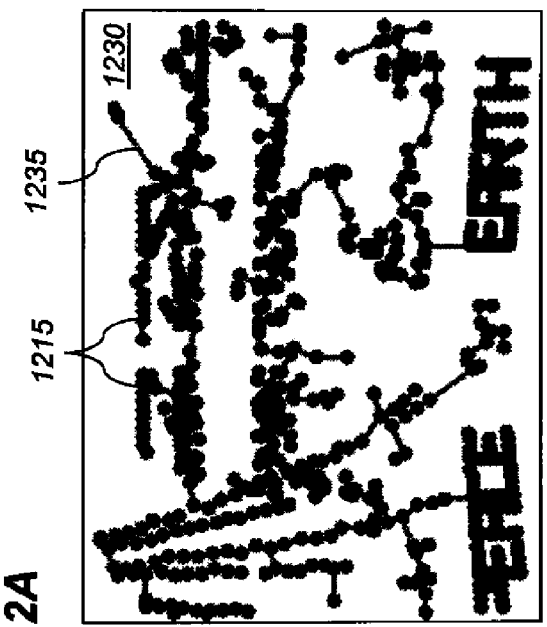
FIG. 12C shows a minimal spanning tree corresponding to the digital image of FIG. 12A.
Figure 12B:
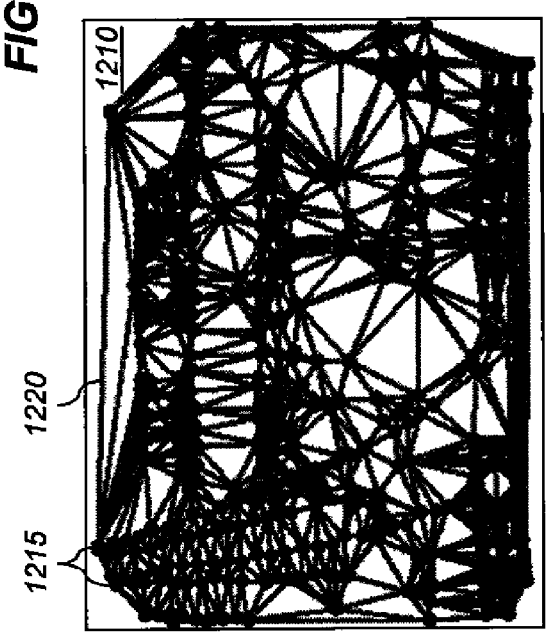
FIG. 12B shows a point source map corresponding to the digital image of FIG. 12A.

In some cases, the man-made light sources are arranged such that they are used to construct words or characters. FIG. 12A illustrates a digital image 1200 of a complex holiday light display that includes many different elements including lighted words 1205 (i.e., "PEACE ON EARTH"). In such cases, spatial processing can be used to detect and decode any alphanumeric characters. FIG. 12B illustrates a point source map 1210 showing a set of detected point sources 1215 determined from the digital image 1200 of FIG. 12A, together with an associated Delaunay graph 1220 that was determined for the set of point sources 1215. FIG. 12C shows a minimal spanning tree 1230 determined using the above-described method for the detected point sources 1215. The minimal spanning tree 1230 includes edges 1235 connecting the nearest point sources 1215 It is clear that the point sources 1215 form alphanumeric characters that spell out the words "PEACE ON EARTH," a well-known Christmas greeting. Although there are some minor imperfections, Optical Character Recognition (OCR) technology can be applied to the detected point sources 1215 (and the related graphs and features) to identify any alphanumeric characters or other symbols. The identified characters and symbols can be included in the event indicators 220 and used by the determine holiday event class step 955 (or any of the other classification steps in FIG. 9) to aid in the determination of the event classification 230. For example, detecting the words "PEACE ON EARTH" in the digital image 1200 would provide a strong indication that the event classification 230 should be "Christmas."

Returning to the discussion of FIG. 9, if the holiday light test 950 determines that the detected point sources are not holiday lights, a determine other point source event class 960 is used to determine the event classification 230. In some embodiments, the determine other point source event class 960 simply sets the event classification to "unknown" and optionally stores information about the point source arrangement in the image metadata 245. In other embodiments, the determine other point source event class 960 uses conventional event classification methods (e.g., methods that are unrelated to the presence of man-made light-emitting sources) to analyze the image and estimate the event classification 230.

If the light source type test 910 determines that the man-made light emitting sources are not candles or point sources (i.e., their type is "other source"), then various tests can be applied to determine the source type. In the example of FIG. 9, only a single fireworks test 980 is shown to determine whether the man-made light emitting sources are fireworks. It will be understood by one skilled in the art that similar tests can be used to identify other types of light-emitting sources such as neon lights, table/floor lamps, automobile lights and road flares.

Figure 13A:
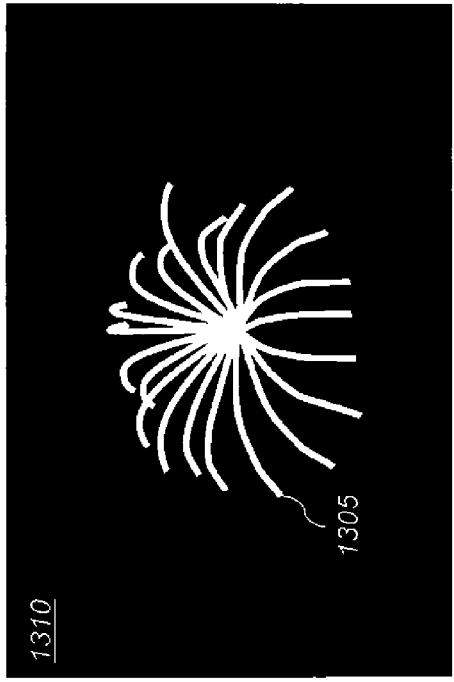
FIGS. 13A and 13B illustrate a sequence of digital images captured at a fireworks display.
Figure 13B:
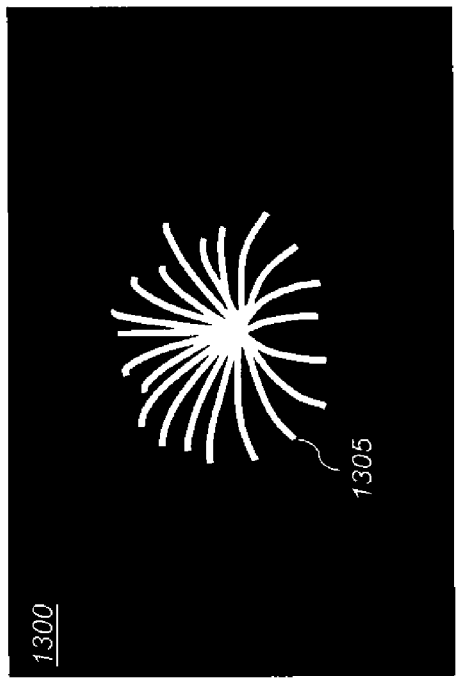

Fireworks are generally comprised of a large number of point sources that travel arced paths emanating from a central point to form the well-known fireworks patterns. However the exposure times used to capture fireworks images are generally long enough that the individual point sources cannot be resolved, but rather are blurred together into arcs. The fireworks test 980 can utilize a classifier trained to identify patterns typical of fireworks displays. FIGS. 13A and 13B show a time sequence of digital images including a first digital image 1300 (captured at a first time) and a second digital image 1310 (captured shortly afterwards). Both digital images depict fireworks 1305. In the second digital image 1310, the fireworks 1305 extend farther out from the center. In some cases, the spatial analysis of the man-made light emitting sources can include feature descriptions that characterize changes to the light source appearance over time. For example, the size of the convex hull enclosing the light sources within a time sequence can be useful for identifying fireworks images. Typically, the size of the convex hull grows as the glowing firework particles travels from the initial blast location. Other examples that can benefit from features that characterize changes to the light source appearance with time would include time sequences of digital images (e.g., videos) with moving or flashing lights.

Returning to the discussion of FIG. 9, if the fireworks test 980 determines that the man-made light emitting sources are fireworks, a determine fireworks event class step 985 is used to determine the event classification 230, and optionally to provide image metadata 245. In some cases, the event classification 230 can simply be set to "fireworks display." Fireworks displays are typically associated with holidays such as Independence Day or New Year's Day. The image capture date associated with the captured image can often provide an indication of the corresponding holiday. In this case, a sub-event classification can be defined (e.g., "Independence Day fireworks display").

Figure 13C:
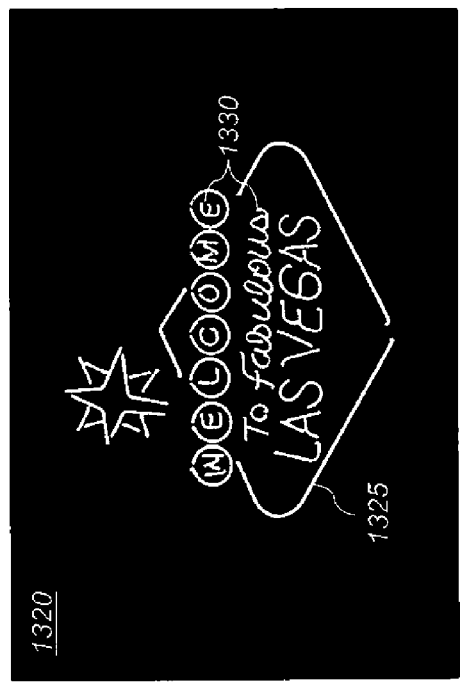
FIG. 13C illustrates a digital image including neon lights.

If the fireworks test 980 determines that the man-made light emitting sources are not fireworks, a determine other source event class 990 is used to determine the event classification 230. In some embodiments, the determine other source event class 990 can apply classifiers to identify other types of man-made light emitting sources. For example, a neon light test can be used to identify neon light sources in a digital image. FIG. 13C shows an example of a digital image 1320 including a neon sign 1325 with an arrangement of neon lights 1330. Detecting the presence of these lights can sometime provide valuable clues as to an appropriate event classification 230. For example, the characters in the neon sign 1325 can be analyzed using OCR technology to recognize the words "WELCOME To Fabulous LAS VEGAS." This would provide a strong indication that an appropriate event classification 230 for the digital image 1320 would be "Las Vegas vacation."

In some embodiments, the determine other source event class 990 simply sets the event classification to "unknown" and optionally stores information about the man-made light emitting sources in the image metadata 245. In other embodiments, the determine other source event class 990 uses conventional event classification methods (e.g., methods that are unrelated to the presence of man-made light-emitting sources) to analyze the image and estimate the event classification 230.

Returning now to a discussion of FIG. 2, the event classification 230, and optionally the image metadata 245, is provided to a store event classification and image metadata step 235 which stores an indication of the event classification 230 and the image metadata 245 in a processor-accessible memory as metadata associated with the set of related digital images 210, thereby providing a classified set of related digital images 240. Some of the information determined by the analyze event indicators step 225 may apply to all of the members of the set of related digital images 210, while other information may only apply to a subset of the set of related digital images 210. For example, the event classification 230 would generally be associated with all members of the set of related digital images 210. On the other hand, only a few of the images may contain recognized elements such as a celebration cake. In the latter case, only those images with the celebration cake would receive metadata tags associated with that information. In some embodiments, metadata related to the man-made light emitting sources detected in each digital image (e.g., the man-made light emitting source information 305 and the spatial arrangement information 315) are stored as metadata associated with that particular digital image.

The event classification 230 and the image metadata 245 can be stored using any format known to those skilled in the art. In some embodiments, the event classification 230 can be stored using metadata tags within the digital image file using standard metadata formats, such as those associated with XMP (Adobe's Extensible Metadata Platform) or EXIF (Exchangeable Image File Format). The event classification 230 can also be associated with the digital images in the set of related digital images 210 via tags in on-line photo sharing websites such as Kodak Gallery or Flickr. In other embodiments, the event classification 230 and the image metadata 245 can be stored in a separate file (e.g., a database) that is associated with some or all of the digital images in the digital image collection 200.

The method discussed with reference to FIG. 2 can be repeated for each set of related digital images 210 identified by the identify related digital images step 205. In some cases, none of the digital images in a particular set of related digital images 210 will contain any man-made light emitting sources. In this instance, other methods known in the art can be used to determine an event classification. One such event classification method that can be used is disclosed in U.S. Patent Application 2010/0124378 to Das, et al. entitled "Method for event-based semantic classification". In some embodiments, the method of the present invention can be combined with other methods for determining an event classification to improve the likelihood of an accurate classification.

Once the event classification 230 has been determined for the set of related digital images 210, this information can be used for a variety of purposes. In some embodiments, the event classification 230 can be used to enable various image organization and retrieval tasks. For example, a search tool can be provided to enable a user to search for digital images associated with a particular event classification.

In some embodiments, the event classification 230 can be used to form a collection of digital images that can be shared with other users. For example, images associated with a birthday event can be shared with family members of the guest of honor.

The event classification 230 can also be used during the process of producing a photo product (e.g., a photo book or a photo calendar) associated with the event classification 230. For example, a photo book (e.g., a wedding album) can be produced containing some, or all, of the digital images in a set of related digital images 210 that was classified as a wedding event. The photo book can be produced for the married couple, or can be presented by the married couple to their parents. Similarly, a photo calendar can be produced containing a selection of digital images from the wedding event that can be presented to the married couple on their wedding anniversary.

In some embodiments, a photo organization program, or an on-line photo sharing website such as Kodak Gallery, can automatically prepare a photo product associated with the determined event classification 230 and offer it for sale to the owner the digital image collection 200, or to other users with whom the digital image collection 200 has been shared.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

110 Data processing system
120 Peripheral system
130 User interface system
140 Processor-accessible memory system
200 digital image collection
205 identify related digital images step
210 set of related digital images
215 detect event indicators step
220 event indicators
225 analyze event indicators step
230 event classification
235 store event classification metadata step
240 classified set of related digital images
245 image metadata
300 detect man-made light emitting sources step
305 man-made light emitting source information
310 analyze spatial arrangement step
315 spatial arrangement information
320 detect cake step
325 cake information
330 detect face information step
340 face recognition information
345 face information
350 extract capture metadata step
355 capture metadata
360 detect auxiliary information step
365 auxiliary information
370 event calendar
400 identify candidate flame image regions step
405 candidate flame image regions
410 extract flame image features step
415 flame image features
420 lit candle present test
425 extract candle information step
430 identify candidate point source locations step
435 candidate point source locations
440 extract point source features step
445 point source features
450 point source present test
455 extract point source information step
460 identify candidate other source regions step
465 candidate other source regions
470 extract other source features step
475 other source features
480 other source present test
485 extract light source information step
500 threshold image step
505 candle flame threshold map
510 connected component analysis step
515 connected component map
520 analyze connected components step
600 background pixels
610 bright pixels
620 halo pixels
700 cake-like candle arrangement test
710 determine candidate cake regions step
715 candidate cake regions
720 extract candidate cake features step
725 candidate cake features
730 find matching candidate cake regions step
735 matching candidate regions
740 segment candidate cake regions step
745 segmented candidate cake regions
750 cake present test
755 extract cake information step
800 digital image
805 birthday cake
810 lit birthday candles
815 guest of honor
820 digital image
825 unlit birthday candles
830 text region
835 age
840 decorative features
845 rectified cake surface region
910 light source type test
920 cake present test
925 determine cake event class step
930 holiday/ceremony test
935 determine holiday/ceremony event class step
940 determine other candle event class step
950 holiday lights test
955 determine holiday event class step
960 determine other point source event class step
980 fireworks test
985 determine fireworks event class step
990 determine other source event class step
1000 digital image
1005 advent wreath
1010 advent candle
1015 central candle
1020 digital image
1025 menorah
1030 menorah candles
1040 digital image
1045 groom
1050 groom candle
1055 bride
1060 bride candle
1065 unity candle
1070 candleholders
1100 digital image
1102 Christmas tree
1104 holiday light
1106 holiday light string
1120 digital image
1122 house
1124 electric candles
1126 house corners
1128 roofline
1140 digital image
1142 decorative jack-o-lantern
1200 digital image
1205 lighted words
1210 point source map
1215 point source
1220 Delauney graph
1230 minimal spanning tree
1235 edge
1300 first digital image
1305 fireworks
1310 second digital image
1320 digital image 1325 neon sign
1330 neon lights

The invention claimed is:

1. A method comprising:
receiving one or more digital images;
detecting one or more light emitting sources within the one or more digital images;
using a data processor to automatically determine an event classification responsive to analyzing a spatial arrangement of the detected light emitting sources in the one or more digital images; and
storing metadata in a processor-accessible memory associating the determined event classification with each of the one or more digital images.

2. The method of claim 1, wherein the spatial arrangement of the detected light emitting sources is analyzed to detect a pattern associated with a particular holiday, ceremony or celebration.

3. The method of claim 1, wherein the one or more light emitting sources include a set of electric holiday lights.

4. The method of claim 3, wherein the set of electric holiday lights are strung along an electrical cord.

5. The method of claim 3, wherein the set of electric holiday lights are arranged on a Christmas tree.

6. The method of claim 3, wherein the set of electric holiday lights are arranged on the outside of a dwelling.

7. The method of claim 3, wherein the set of electric holiday lights include one or more electric candles.

8. The method of claim 3, wherein the event classification determined by analyzing the spatial arrangement of the electric holiday lights is a Christmas event classification, a Hanukah event classification, a New Year's event classification, a wedding event classification or a Halloween event classification.

9. The method of claim 1, wherein the one or more light emitting sources include one or more lit candles.

10. The method of claim 1, wherein the one or more light emitting sources include neon lights.

11. The method of claim 1, wherein the one or more light emitting sources include fireworks.

12. The method of claim 1, wherein the one or more light emitting sources are arranged to depict one or more alphanumeric characters, and wherein the spatial arrangement of the detected light emitting sources is analyzed to recognize the one or more alphanumeric characters.

13. The method of claim 12, wherein the recognized alphanumeric characters are used in the determination of the event classification.

14. The method of claim 12, wherein the recognized alphanumeric characters are stored as metadata in association with the one or more digital images.

15. The method of claim 1, wherein the analysis of the spatial arrangement of the detected light emitting sources includes analyzing the relative locations of the detected light emitting sources within the one or more digital images.

16. The method of claim 1, wherein the analysis of the spatial arrangement of the detected light emitting sources includes analyzing distances between pairs of detected light emitting sources.

17. The method of claim 1, wherein colors of the detected light emitting sources are determined and used in the determination of the event classification.

18. The method of claim 1, wherein the determined event classification is used to classify at least one additional digital image that is determined to be related to the one or more digital images.

19. The method of claim 1, further including producing a photo product associated with the determined event classification using one or more of the digital images.

20. A non-transitory computer readable medium having instructions stored thereon that upon execution by a computing device, cause the computing device to perform operations comprising:
receiving one or more digital images;
detecting one or more light emitting sources within the one or more digital images;
using a data processor to automatically determine an event classification responsive to analyzing a spatial arrangement of the detected light emitting sources in the one or more digital images; and
storing metadata in a processor-accessible memory associating the determined event classification with each of the one or more digital images.

21. The computer readable medium of claim 20, wherein the spatial arrangement of the detected light emitting sources is analyzed to detect a pattern associated with a particular holiday, ceremony or celebration.

22. An apparatus comprising:
a processor configured to detect one or more light emitting sources within digital images and automatically determine an event classification responsive to analyzing a spatial arrangement of the detected light emitting sources in the digital images; and
a processor-accessible memory coupled to the processor and configured to store metadata associating the determined event classification with each of the digital images.

23. The apparatus of claim 22, wherein the spatial arrangement of the detected light emitting sources is analyzed to detect a pattern associated with a particular holiday, ceremony or celebration.

* * * * *